US009590864B2

(12) United States Patent
Kawakami et al.

(10) Patent No.: US 9,590,864 B2
(45) Date of Patent: Mar. 7, 2017

(54) NETWORK MANAGEMENT APPARATUS AND NETWORK MANAGEMENT METHOD

(71) Applicant: FUJITSU LIMITED, Kawasaki-shi, Kanagawa (JP)

(72) Inventors: Toru Kawakami, Yokohama (JP); Nobumasu Kobayashi, Numazu (JP); Kei Nakata, Yokohama (JP); Naohiro Tamura, Yokohama (JP); Sawao Iwatani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 371 days.

(21) Appl. No.: 14/030,094

(22) Filed: Sep. 18, 2013

(65) Prior Publication Data

US 2014/0019608 A1    Jan. 16, 2014

Related U.S. Application Data

(63) Continuation of application No. PCT/JP2011/056852, filed on Mar. 22, 2011.

(51) Int. Cl.
*H04L 12/24* (2006.01)
*H04L 12/46* (2006.01)
*H04L 29/12* (2006.01)

(52) U.S. Cl.
CPC .......... *H04L 41/26* (2013.01); *H04L 12/4625* (2013.01); *H04L 41/0893* (2013.01);
(Continued)

(58) Field of Classification Search
CPC . H04L 49/354; H04L 49/253; H04L 12/4641; H04L 41/0893; H04L 63/10
(Continued)

(56) References Cited

U.S. PATENT DOCUMENTS 6,167,052 A * 12/2000 McNeill ................ H04L 12/467
                                                       370/399
2003/0147385 A1* 8/2003 Montalvo ............. H04L 47/125
                                                       370/389

(Continued)

FOREIGN PATENT DOCUMENTS

JP    2000-134207    5/2000
JP    2004-104709    4/2004

OTHER PUBLICATIONS

TCC_2, "Switch ports become inactive when they are members of VLANs that do not exist in the VLAN database of Catalyst 5000 series switch," Jul. 22, 2009, Cisco Support Community, supportforums.cisco.com/document/21286/switch-ports-become-inactive-when-they-are-members-vlans-do-not-exist-vlan-database.*

(Continued)

*Primary Examiner* — Ruolei Zong
(74) *Attorney, Agent, or Firm* — Staas & Halsey LLP

(57) ABSTRACT

A network management apparatus includes a first storage unit, a second storage unit, and a controller. The first storage unit stores therein communication groups included in the same subnet and information about communication devices belonging to the respective communication groups in association with each other. The second storage unit stores therein for each of the communication devices a port of a relaying device connected to the communication device as a connection destination port. The controller allows the relaying devices to perform communication between the connection destination ports on the basis of the first storage unit and the second storage unit to allow communication only between the communication devices belonging to the same communication group.

8 Claims, 22 Drawing Sheets

(52) U.S. Cl.
CPC .............. *H04L 41/12* (2013.01); *H04L 41/28* (2013.01); *H04L 61/103* (2013.01)

(58) Field of Classification Search
USPC ........ 709/223, 225, 226, 229, 245, 249, 250
See application file for complete search history.

(56) References Cited

U.S. PATENT DOCUMENTS

| | | | | |
|---|---|---|---|---|
| 2009/0316572 | A1* | 12/2009 | Zhang | ..................... H04L 45/00 370/220 |
| 2012/0039334 | A1* | 2/2012 | Mehta | ................. H04L 12/1886 370/390 |

OTHER PUBLICATIONS

"Configuring Isolated Private VLANs on Catalyst Switches," Document ID: 40781, Cisco Systems, Inc., Jul. 11, 2008, http://www.cisco.com/JP/support/public/ht/tac/100/1007932/194-j.pdf, 30 pages.

Tetsuto Yoshikawa, "Virtual LAN," Open Design, vol. 4, No. 6, Dec. 1, 1997, 26 pages.

Masatoshi Takihiro et al., "A Subscriber Management Method for Ethernet Access Networks," IEICE Technical Report, vol. 102, No. 694, Feb. 28, 2003, 13 pages.

English language International Search Report for PCT/JP2011/056852, mailed Apr. 26, 2011, 2 pages.

\* cited by examiner

FIG.4

| id | name | ip_address | tenant_id | related_id | mac_address |
|---|---|---|---|---|---|
| Server A | svA | 1.1.1.4 | Company A | Port A1 | 11:11:11:11:11:11 |
| Server B | svB | 1.1.1.5 | Company A | Port B1 | 11:11:11:11:11:22 |
| Server C | svC | 1.1.1.6 | Company B | Port B2 | 11:11:11:11:11:33 |
| Server D | svD | 1.1.1.7 | | Port A2 | 11:11:11:11:11:44 |

Columns: 13a, 13b, 13c, 13d, 13e, 13f (table 13)

FIG.5

| id | switch_id | mac_address | is_admin | related_id |
|---|---|---|---|---|
| Port A1 | Switch A | 21:11:11:11:11:11 | false | Server A |
| Port A2 | Switch A | 21:11:11:11:11:12 | false | Server D |
| Port A3 | Switch A | 21:11:11:11:11:13 | true | Port C1 |
| Port B1 | Switch B | 21:11:11:11:11:14 | false | Server B |
| Port B2 | Switch B | 21:11:11:11:11:15 | false | Server C |
| Port B3 | Switch B | 21:11:11:11:11:16 | true | Port C2 |
| Port C1 | Switch C | 21:11:11:11:11:17 | false | Port A2 |
| Port C2 | Switch C | 21:11:11:11:11:18 | false | Port B3 |
| Port C3 | Switch C | 21:11:11:11:11:19 | true | Manager |

Columns: 14a, 14b, 14c, 14d, 14e (table 14)

FIG.14A

| id | vendor | ip_address | account_name | account_password |
|---|---|---|---|---|
| Switch A | V1 | 1.1.1.1 | admin | admin |

| id | switch_id | mac_address | is_admin | related_id |
|---|---|---|---|---|
| Port A1 | Switch A | 21:11:11:11:11:11 | false | |
| Port A2 | Switch A | 21:11:11:11:11:12 | false | |
| Port A3 | Switch A | 21:11:11:11:11:13 | false | | r1, r2, r3

14

| id | switch_id | mac_address | is_admin | related_id |
|---|---|---|---|---|
| Port A1 | Switch A | 21:11:11:11:11:11 | false | Server A |
| Port A2 | Switch A | 21:11:11:11:11:12 | false | Server D |
| Port A3 | Switch A | 21:11:11:11:11:13 | false | Port C1 | c1

14

| id | switch_id | mac_address | is_admin | related_id |
|---|---|---|---|---|
| Port A1 | Switch A | 21:11:11:11:11:11 | false | Server A |
| Port A2 | Switch A | 21:11:11:11:11:12 | false | Server D |
| Port A3 | Switch A | 21:11:11:11:11:13 | true | Port C1 | c2

| id | name | ip_address | tenant_id | related_id | mac_address |
|---|---|---|---|---|---|
| Server A | svA | 1.1.1.4 | | Port A1 | 11:11:11:11:11:11 |

| id | name | ip_address | tenant_id | related_id | mac_address |
|---|---|---|---|---|---|
| Server A | svA | 1.1.1.4 | Company A | Port A1 | 11:11:11:11:11:11 |

| id | name | server_id |
|---|---|---|
| Tenant A | Company A | Server A |

11 c4

| id | name | ip_address | tenant_id | related_id | mac_address |
|---|---|---|---|---|---|
| Server A | svA | 1.1.1.4 |  | Port A1 | 11:11:11:11:11:11 | c6

FIG.28

TENANT DEFINITION

Tenant Name:

[g11 input field]

[OK] (g12)  [Cancel] (g13)

PARTICIPATION IN TENANT

Defined Tenant List:

| Tenant Name |
|---|
| Company A |
| Company B |
| ... |

(g21)

Pool Server List:

| Server Name |
|---|
| Server D |

(g22)

[OK] (g23)  [Cancel] (g24)

(g2)

NETWORK MANAGEMENT APPARATUS AND NETWORK MANAGEMENT METHOD

CROSS-REFERENCE TO RELATED APPLICATION(S)

This application is a continuation of International Application No. PCT/JP2011/056852, filed on Mar. 22, 2011, the entire contents of which are incorporated herein by reference.

FIELD

The embodiments discussed herein are directed to a network management apparatus and the like.

BACKGROUND

There have been the following techniques for separating networks from each other. One of the techniques uses different switches for respective subnets and physically separates the subnets from each other by connecting servers to the switches. The other technique logically separates the subnets from each other over the switches using a virtual LAN (VLAN) technique without changing the physical wiring of the servers connected to the switches.

The VLAN technique, however, does not support more than 4096 subnets because the technique can separate only up to 4096 subnets from each other. When more than 4096 subnets are to be separated from each other, techniques that separate a single subnet into a plurality of networks are employed. A private virtual LAN (PVLAN) technique is one of such techniques. The PVLAN technique separates servers in the same subnet from each other in Layer 2 using switches having special functions.

For example, refer to http://www.cisco.com/JP/support/public/ht/tac/100/1007932/1 94-j.shtml "Configuring Isolated Private VLANs on Catalyst Switches".

The conventional technique, which separates a single subnet into a plurality of networks, however, has a problem in that security of each separated network is not secured unless the switches having special functions are used because the technique requires the switches to have special functions. That is, in the PVLAN technique, only the switches having special functions can secure the security of each separated network because the technique uses the switches having special functions.

The conventional technique using different switches for respective subnets does not separate a single subnet into a plurality of networks. The conventional technique using the VLAN technique also does not separate a single subnet into a plurality of networks.

Such problems also occur when a single subnet is separated into a plurality of tenants. A tenant is a group of a plurality of servers provided to a company, for example.

SUMMARY

According to an aspect of an embodiment, a network management apparatus, includes a first storage unit, a second storage unit, and a controller. The first storage unit stores therein communication groups included in the same subnet and information about communication devices belonging to the respective communication groups in association with each other. The second storage unit stores therein for each of the communication devices a port of a relaying device connected to the communication device as a connection destination port. The controller allows the relaying devices to perform communication between the connection destination ports on the basis of the first storage unit and the second storage unit to allow communication only between the communication devices belonging to the same communication group.

According to another aspect of an embodiment, a network management method by which a network management apparatus manages a network including communication groups included in a same subnet, the network management method includes: when a relaying device is added to the network, controlling all ports of the relaying device to be inactive; and on the basis of a first storage unit that stores therein the communication groups and information about communication devices belonging to the respective communication groups in association with each other and a second storage unit that stores therein for each of the communication devices a port of the relaying device connected to the communication device as a connection destination port, allowing the relaying device to be added to perform communication between the communication destination ports to allow communication only with the communication devices belonging to the same communication group.

According to still another aspect of an embodiment, a computer-readable recording medium has stored therein a program. The program causes a computer to execute a process including: when a relaying device is added to a network including communication groups included in a same subnet, controlling all ports of the relaying device to be inactive; and on the basis of a first storage unit that stores therein the communication groups and information about communication devices belonging to the respective communication groups in association with each other and a second storage unit that stores therein for each of the communication devices a port of the relaying device connected to the communication device as a connection destination port, allowing the relaying device to be added to perform communication between the communication destination ports to allow communication only with the communication devices belonging to the same communication group.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a schematic diagram illustrating an example of a data structure of a server table;

FIG. 5 is a schematic diagram illustrating an example of a data structure of a port table;

FIG. 14A is a schematic diagram illustrating a specific example of an updating of the switch table;

FIG. 14B is a schematic diagram illustrating a transition of an updating of the port table;

FIG. 20A is a schematic diagram illustrating a specific example of an updating of the server table;

FIG. 20B is a schematic diagram illustrating a specific example of an updating of the tenant table;

FIG. 28 is a schematic diagram illustrating an example of a dialog box displayed in processing to define the tenant;

FIG. 29 is a schematic diagram illustrating an example of a dialog box displayed in processing to participate in the tenant;

DESCRIPTION OF EMBODIMENT

Preferred embodiments of the present invention will be explained with reference to accompanying drawings. The present invention is not limited by the embodiments.

Figure 1:
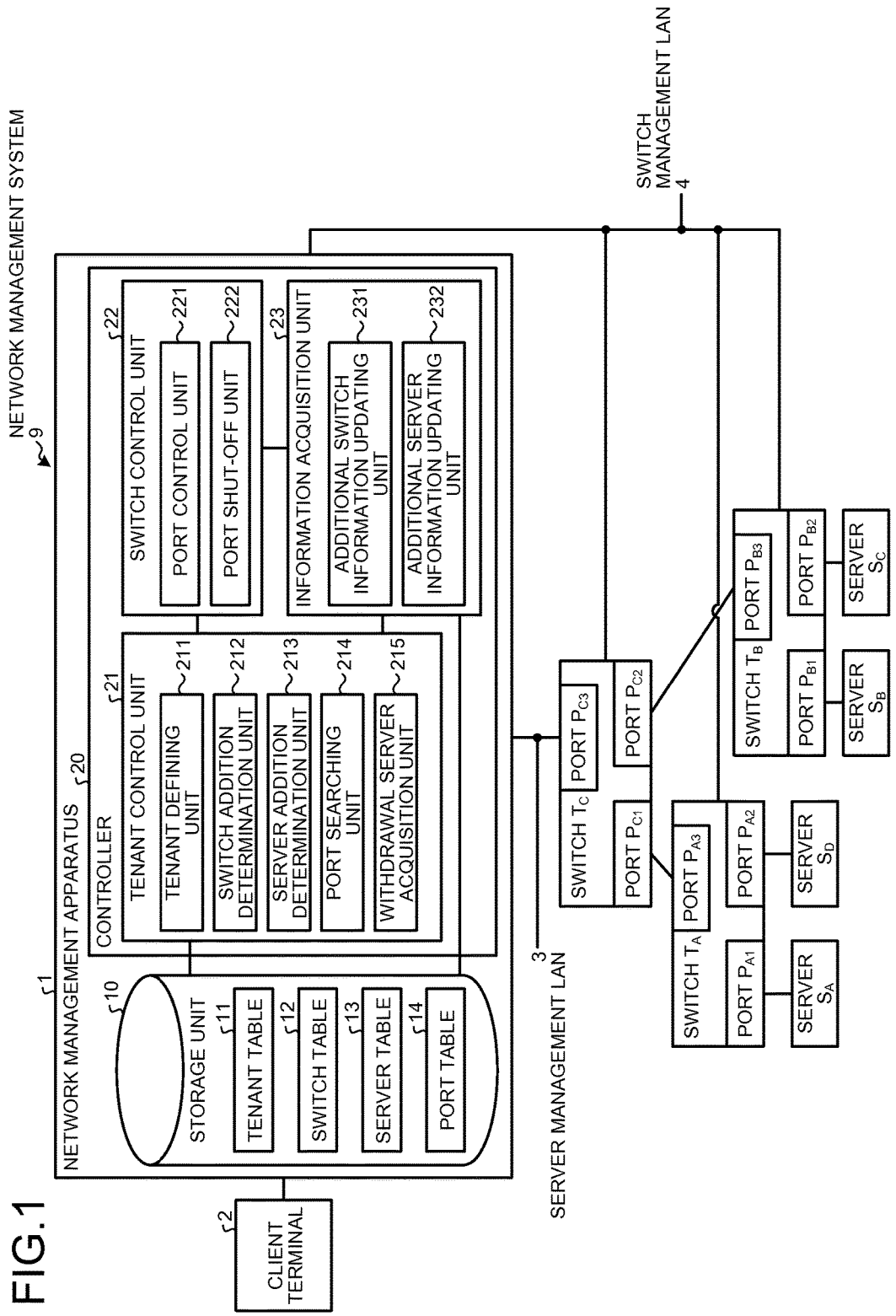
FIG. 1 is a functional block diagram illustrating a structure of a network management system according to an embodiment.

FIG. 1 is a functional block diagram illustrating a structure of a network management system according to an embodiment. As illustrated in FIG. 1, a network management system 9 includes a network management apparatus 1, a client terminal 2, a plurality of switches T (e.g., $T_A$ to $T_C$), and a plurality of servers S (e.g., $S_A$ to $S_D$). The network management apparatus 1 is coupled to the switch $T_C$, which is provided at a higher level among the switches T, through a server management LAN 3. The network management apparatus 1 is coupled to the switches T ($T_A$ to $T_C$) through a switch management LAN 4.

The switch T is a relaying device that relays communication between the servers S and connects to the respective servers S with ports P equipped in the switch T. For example, the switch T is a bridge or a switching hub. The switch T may be a relaying device that has a function to filter communication using information such as an internet protocol (IP) address and a port number. A case is described herein where the switch T is a bridge having an IP filtering function, as an example. The switches T may be supplied from a single vendor for all the switches or supplied from multiple vendors.

The network management apparatus 1 manages communication of respective communication groups in a network. The network may include a plurality of subnets. The subnet may include multiple communication groups. Software for network management is installed in the network management apparatus 1. Hereinafter, the software for network management is also described as "network management software". The communication group communication of which is managed by the network management apparatus 1 is a tenant, for example. A tenant is a group of a plurality of servers with which a single company can communicate, for example. As many tenants as companies are included.

The client terminal 2 connects to the network management apparatus 1 and outputs information about network management to the network management apparatus 1 using a graphical user interface (GUI). Examples of the information about network management include information about the server to be added to the network, information about the server caused to participate in the tenant, and information about the server caused to withdraw from the tenant. The "server caused to participate in the tenant" means the server that is allowed to communicate with the servers belonging to the tenant. The "server caused to withdraw from the tenant" means the server that is disallowed to communicate with the servers belonging to the tenant. The client terminal 2 may be a fixed terminal such as a personal computer or a mobile terminal such as a mobile phone, a personal handyphone system (PHS), or a personal digital assistant (PDA), for example.

A storage unit 10 includes a tenant table 11, a switch table 12, a server table 13, and a port table 14. The tenant table 11 stores therein information about servers belonging to the respective tenants included in the same subnet for each of the tenants. The switch table 12 stores therein information such as account information to access the switch for each switch. The server table 13 stores therein information about a port of the switch connected to the server (hereinafter described as a connection destination port) for each server. The port table 14 stores therein information about the port equipped in the switch for each port. The detailed explanations of the tenant table 11, the switch table 12, the server table 13, and the port table 14 are described later. The storage unit 10 is a semiconductor memory element such as a random access memory (RAM), or a flash memory, or a storage device such as a hard disk drive or an optical disk device.

Figure 2:
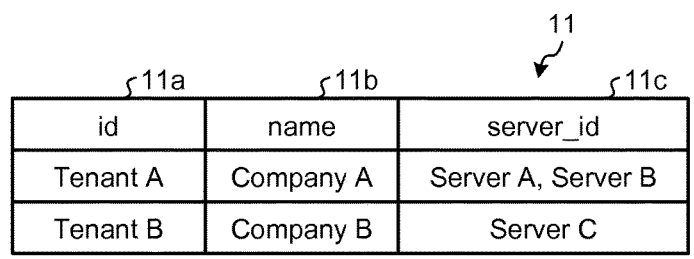
FIG. 2 is a schematic diagram illustrating an example of a data structure of a tenant table.
Figure 3:
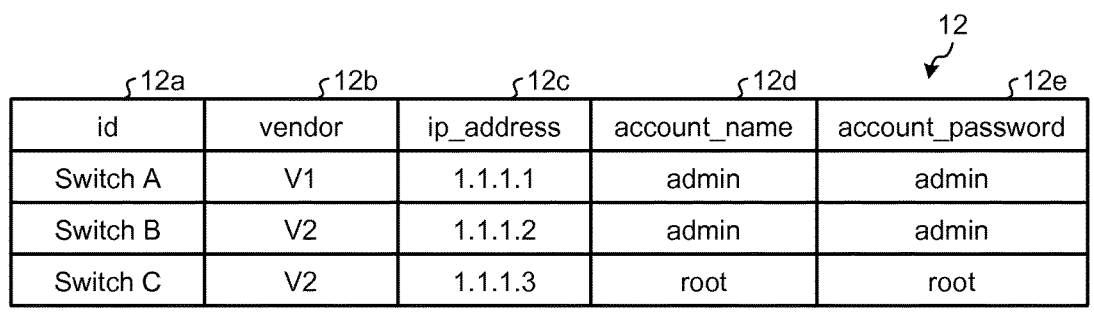
FIG. 3 is a schematic diagram illustrating an example of a data structure of a switch table.

The data structures of the various tables included in the storage unit 10 are described with reference to FIGS. 2 to 5. FIG. 2 illustrates an example of the data structure of the tenant table. FIG. 3 illustrates an example of the data structure of the switch table. FIG. 4 illustrates an example of the data structure of the server table. FIG. 5 illustrates an example of the data structure of the port table.

As illustrated in FIG. 2, the tenant table 11 stores therein a name 11b and a server_id 11c in association with each other for each id (identification) 11a. The id 11a indicates the identification ID that identifies the tenant and is automatically allocated using alphanumeric characters, for example. The name 11b indicates the name of the tenant and stores therein information input from the client terminal 2. The server_id 11c indicates the identification ID that identifies the server belonging to the tenant.

As illustrated in FIG. 3, the switch table 12 stores therein a vendor 12b, an ip_address 12c, an account_name 12d, and an account_password 12e in association with each other for each id 12a. The id 12a indicates the identification ID that identifies the switch and is automatically allocated using alphanumeric characters, for example. The vendor 12b indicates the name of the vendor of the switch. The ip_address 12c indicates the IP address of the switch and stores therein information input from the client terminal 2. The account_name 12d and the account_password 12e indicate the account and the password to access the switch, respectively, and store therein information input from the client terminal 2. A telecommunication network (telnet) or a simple network management protocol (snmp) is used for accessing the switch, for example.

As illustrated in FIG. 4, the server table 13 stores therein a name 13b, an ip_address 13c, a tenant_id 13d, a related_id 13e, and a mac_address 13f in association with each other for each id 13a. The id 13a indicates the identification ID that identifies the server and is automatically allocated using alphanumeric characters, for example. The name 13b and the ip_address 13c indicate the name of the server and the IP address of the server, respectively, and store therein information input from the client terminal 2. The tenant_id 13d indicates the identification ID that identifies the tenant to which the server belongs. The related_id 13e indicates the identification ID of the port of the switch connected to the server, i.e., the identification ID of the connection destination port. The mac_address 13f indicates a MAC address of a network interface card (NIC) connected to the switch management LAN 4.

As illustrated in FIG. 5, the port table 14 stores therein a switch_id 14b, a mac_address 14c, an is_admin 14d, and a related_id 14e in association with each other for each id 14a. The id 14a indicates the identification ID that identifies the port and is automatically allocated using alphanumeric characters, for example. The switch_id 14b indicates the identification ID of the switch equipped with the port. The mac_address 14c indicates the MAC address of the port. The is_admin 14d indicates a flag that determines whether the port is a management port to communicate with the network management software. For example, when the flag is "true", this indicates that the port is a management port to communicate with the network management software. When the flag is "false", this indicates that the port is not a management port to communicate with the network management software. The related_id 14e is information about the device serving as a connection destination to which the port is connected and indicates the identification ID of the switch or the identification ID of the server.

A controller 20 includes a tenant control unit 21, a switch control unit 22, and an information acquisition unit 23. The respective functional units of the controller 20 are built in the network management software. The controller 20 is an integrated circuit such as an application specific integrated circuit (ASIC) or a field programmable gate array (FPGA), or an electronic circuit such as a central processing unit (CPU) or a micro processing unit (MPU), for example.

The tenant control unit 21 initializes the tenant table 11. When the server is caused to participate in the tenant, the tenant control unit 21 searches for the ports of the switches to be controlled so as to enable communication between the server caused to participate in the tenant and the other servers belonging to the tenant. When the server is caused to withdraw from the tenant, the tenant control unit 21 searches for the port of the switch connected to the server caused to withdraw. As a result, the tenant control unit 21 separates the server caused to withdraw from the tenant by controlling the searched switch. The tenant control unit 21 includes a tenant defining unit 211, a switch addition determination unit 212, a server addition determination unit 213, a port searching unit 214, and a withdrawal server acquisition unit 215.

When the server is caused to participate in the tenant, the switch control unit 22 allows communication between the server and the servers belonging to the tenant using the ports of the switches to be controlled searched by the tenant control unit 21. When the server is caused to withdraw from the tenant, the switch control unit 22 disallows communication of the servers except for the server and the network management apparatus 1 using the ports of the switches to be controlled searched by the tenant control unit 21. The switch control unit 22 includes a port control unit 221 and a port shut-off unit 222.

The information acquisition unit 23 updates information about the switch that is newly added. The information acquisition unit 23 also updates information about the server that is newly added. The information acquisition unit 23 includes an additional switch information updating unit 231 and an additional server information updating unit 232.

When creation of a new tenant is instructed from the client terminal 2, the tenant defining unit 211 produces in the tenant table 11 new data relating to the tenant name the creation of which is instructed. When producing the new data, the tenant defining unit 211 sets the value of the server_id 11c identifying the server belonging to the tenant to blank.

The switch addition determination unit 212 determines whether the switch can be added to the network when the switch is added to the network. For example, when addition of the switch is instructed from the client terminal 2, the switch addition determination unit 212 determines whether the model name of the switch the addition of which is instructed can be acquired. When the model name can be acquired, the switch addition determination unit 212 determines that the switch can be added, and requests the additional switch information updating unit 231 to update the information about the switch the addition of which is instructed. When the information about the switch to be added is updated by the additional switch information updating unit 231, the port control unit 221 shuts off all the ports of the switch to be added.

The server addition determination unit 213 determines whether the server can be added to the network when the server is added to the network. For example, when addition of the server is instructed from the client terminal 2, the server addition determination unit 213 determines whether the model name of the server the addition of which is instructed can be acquired. When the model name can be acquired, the server addition determination unit 213 determines that the server can be added, and requests the additional server information updating unit 232 to update the information about the server the addition of which is instructed. When the information about the server to be added is updated by the additional server information updating unit 232, the port control unit 221 secures a communication path between the server to be added and the network management software.

The port searching unit 214 searches for the connection destination ports of the switches that control the communication between the server caused to participate in the tenant and the servers belonging to the same tenant as the server caused to participate. For example, when participation of the server in the tenant is instructed from the client terminal 2, the port searching unit 214 updates, in the server table 13 and the tenant table 11, information about the server of which the participation in the tenant is instructed. The port searching unit 214 acquires one of the servers belonging to the same tenant as the server caused to participate on the basis of the tenant table 11. Then, the port searching unit 214 acquires the switch connected to the server caused to participate and the connection destination port on the basis of the server table 13 and the port table 14. Then, the port searching unit 214 acquires the switch connected to the server belonging to the same tenant and the connection destination port on the basis of the server table 13 and the port table 14. In addition, the port searching unit 214 determines whether the respective switches connected to both servers are the same. When determining that the switches are the same, the port searching unit 214 sets the respective connection destination ports of the switches connected to both servers as control target ports. Then, the port searching unit 214 acquires the IP addresses and the account information of the respective switches connected to both servers from the switch table 12 and acquires the IP addresses of both servers from the server table 13. In addition, the port searching unit 214 hands over the acquired control target ports, the IP addresses and the account information of the switches, and the IP addresses of both servers to the port control unit 221 so as to allow communication between the servers. The account information indicates the account name and the account password. Both servers mean the server caused to participate in the tenant and the server belonging to the same tenant as the server caused to participate.

When determining that the respective switches connected to both servers are not the same, the port searching unit 214 acquires the switches and the connection destination ports of the switches connected to the server belonging to the same tenant in a step-by-step manner. For example, when the switch connected to the server belonging to the same tenant is provided at the uppermost level in the network, the port searching unit 214 fails to acquire the switches connected to the switch connected to the server in step-by-step manner in some cases. In such a case, the port searching unit 214 acquires the switches and the connection destination ports of the switches connected to the server caused to participate in a step-by-step manner. The port searching unit 214 repeats the determination processing on switches until the respective switches connected to both servers are the same. When multiple servers belong to the same tenant as the server caused to participate, the port searching unit 214 repeats the processing on the multiple servers in the same manner as described above.

The withdrawal server acquisition unit 215 searches for the port of the switch, which port is controlled by the withdrawal server acquisition unit 215 to separate from the tenant the server caused to withdraw from the tenant. For example, when the withdrawal of the server from the tenant is instructed from the client terminal 2, the withdrawal server acquisition unit 215 acquires from the server table 13 the connection destination port of the switch connected to the server the withdrawal of which is instructed. The withdrawal server acquisition unit 215 acquires the switch having the acquired connection destination port from the port table 14. In addition, the withdrawal server acquisition unit 215 acquires the respective ports including the management port of the acquired switch from the port table 14. The withdrawal server acquisition unit 215 acquires the IP address and the account information of the acquired switch from the switch table 12. Then, the withdrawal server acquisition unit 215 hands over the respective ports including the management port of the acquired switch, and the IP address and the account information of the switch to the port shut-off unit 222 so as to withdraw the server caused to withdraw from the tenant. The account information indicates the account name and the account password.

The additional switch information updating unit 231 updates the information about the switch to be added in the switch table 12 and the port table 14 when the switch is added. The additional switch information updating unit 231 hands over the IP address and the account information of the switch to be added to the port control unit 221 so as to shut off all the ports of the switch to be added. The information about the switch to be added includes the IP address and the account information (the account name and the account password) of the switch output from the client terminal 2.

The additional server information updating unit 232 updates the information about the server to be added in the server table 13 when the server is added. The information about the server to be added includes the name and the IP address of the server output from the client terminal 2. The additional server information updating unit 232 hands over the IP address of the server and the connection destination port, the IP address, the management port, and the account information of the switch connected to the server to the port control unit 221 so as to provide a communication path between the server to be added and the network management apparatus 1. For example, the additional server information updating unit 232 acquires the connection destination port of the switch connected to the server to be added using a command acquiring information about a network device such as the switch or the server. The additional server information updating unit 232 acquires the IP address of the switch connected to the server to be added using a command acquiring information of the switch. Furthermore, the additional server information updating unit 232 acquires the account information of the switch connected to the server on the basis of the switch table 12. In addition, the additional server information updating unit 232 acquires the identification ID of the switch corresponding to the IP address of the switch and acquires the management port corresponding to the acquired identification ID on the basis of the switch table 12 and the port table 14. The command acquiring the information about the network device is a simple network management protocol-get (SNMP-get), for example.

When the switch is added, the port control unit 221 controls all ports of the switch to be inactive. For example, the port control unit 221 acquires the IP address and the account information of the switch to be added from the additional switch information updating unit 231. Then, the port control unit 221 logs in into the switch through the switch management LAN 4 using the acquired IP address and account information of the switch, and sequentially causes all the ports equipped in the switch to be inactive. The sequence by which the port control unit 221 causes the ports to be inactive may be set in any sequence.

When the server is added, the port control unit 221 allows communication between the connection destination port of the switch connected to the server to be added and the management port of the switch. For example, the port control unit 221 acquires the IP address of the server to be added, and the connection destination port, the IP address, the management port, and the account information of the switch connected to the server from the additional server information updating unit 232. The port control unit 221 logs in into the switch through the switch management LAN 4 using the acquired IP address and account information. The port control unit 221 allows communication between the server to be added and the network management apparatus 1 using IP filtering on the connection destination port and the management port of the logged in switch. In this way, when the switch is added, the port control unit 221 preliminarily causes all ports of the switch to be inactive, thereby once disallowing the communication of the servers connected to the ports. When the server is added, the port control unit 221 newly allows the server to be added to communicate only with the network management apparatus 1. In other words, the port control unit 221 disallows the server to be added to communicate with the servers except for the network management apparatus 1. As a result, the port control unit 221 shuts off the communication between the server to be added and the servers except for the network management apparatus 1, thereby making it possible to prevent information leakage and infection by a virus between the server to be added and the other servers.

When the server is caused to participate in the tenant, the port control unit 221 controls the connection destination ports of the switch connected to the server caused to participate and the server belonging to the same tenant to be active so as to allow communication only between both servers. For example, the port control unit 221 acquires the control target ports, the IP addresses and the account information of the switch, and the IP addresses of both servers from the port searching unit 214. The port control unit 221 logs in into the switch through the switch management LAN 4 using the acquired IP addresses and account information. The port control unit 221 allows communication between both servers using the IP filtering on the respective control target ports of the logged in switches of both servers. In this way, when the switch is added, the port control unit 221 preliminarily causes all ports of the switch to be inactive, thereby once disallowing communication of the servers connected to the ports. Then, when the server is caused to participate in the tenant, the port control unit 221 newly allows the server caused to participate to communicate only with the servers belonging to the same tenant. In other words, the port control unit 221 disallows the server caused to participate to communicate with the servers except for the servers belonging to the same tenant. As a result, the port control unit 221 shuts off the communication between the server caused to participate and the servers except for the servers belonging to the same tenant, thereby making it possible to prevent information leakage and infection by a virus between the tenants.

When the server is caused to withdraw from the tenant, the port shut-off unit 222 controls the port of the switch connected to the server caused to withdraw so as to disallow communication of the servers except for the server caused to withdraw and the network management apparatus. For example, the port shut-off unit 222 acquires the respective ports including the management port of the switch, and the IP address and the account information of the switch from the withdrawal server acquisition unit 215. The port shut-off unit 222 logs in into the switch through the switch management LAN 4 using the acquired IP address and account information. The port shut-off unit 222 sequentially acquires the ports of the logged in switch. When the acquired port is the connection destination port, the port shut-off unit 222 prohibits communication of the servers except for the server caused to withdraw and the network management apparatus 1 using the IP filtering on the acquired port. When the acquired port is the management port, the port shut-off unit 222 performs no IP filtering processing. When the acquired port is not the management port and is also not the connection destination port, the port shut-off unit 222 prohibits the communication with the server caused to withdraw using the IP filtering on the acquired port. In this way, the port shut-off unit 222 prohibits the respective ports except for the management port of the switch connected to the server caused to withdraw from the tenant from communicating with the server caused to withdraw from the tenant. As a result, the port shut-off unit 222 shuts off communication between the server caused to withdraw and the servers except for the network management apparatus 1, thereby making it possible to prevent information leakage and infection by a virus between the server caused to withdraw and the other servers.

Sequence of Processing to Define Tenant According to the Embodiment

Figures 6, 7:
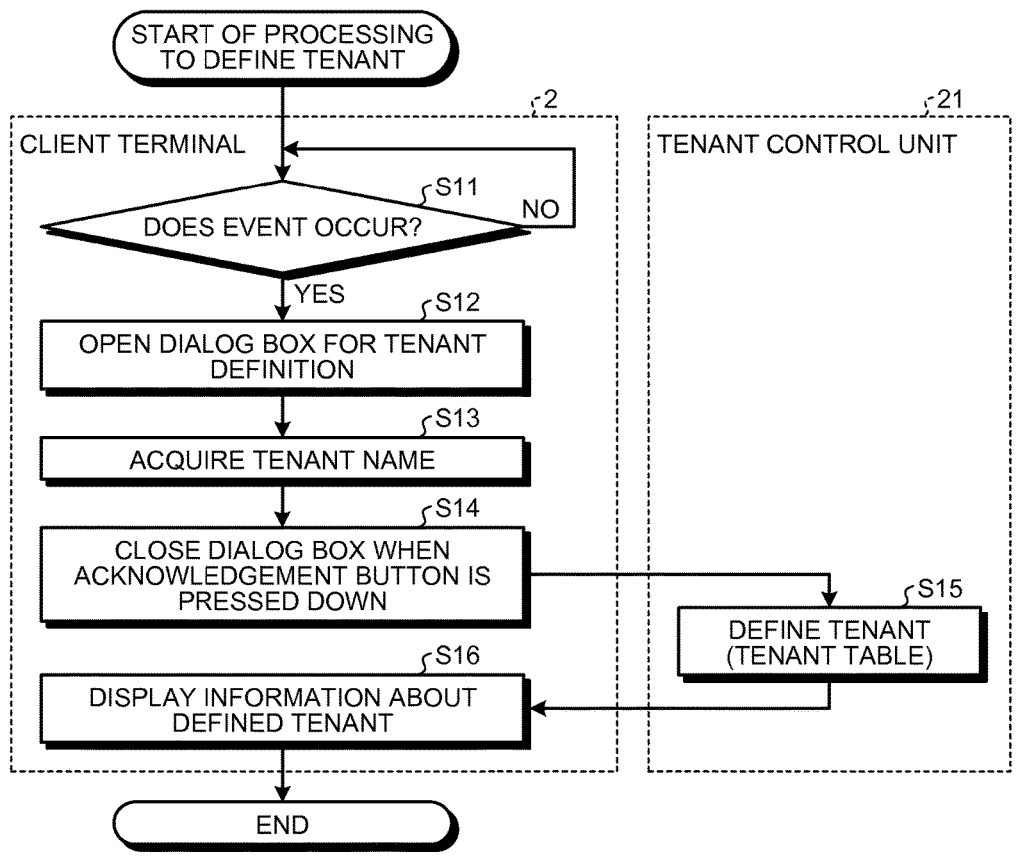
FIG. 6 is a schematic diagram illustrating a sequence of processing to define a tenant according to the embodiment.
FIG. 7 is a schematic diagram illustrating a specific example of a tenant definition.

The following describes a sequence of processing to define the tenant according to the embodiment with reference to FIG. 6. FIG. 6 is a schematic diagram illustrating the sequence of the processing to define the tenant according to the embodiment. In the explanation of the sequence of the processing to define the tenant, FIG. 7 is referred to. FIG. 7 is a schematic diagram illustrating a specific example of the tenant definition.

First, the client terminal 2 determines whether an event occurs instructing the creation of a new tenant (Step S11). If it is determined that no event occurs instructing the creation of a new tenant (No at Step S11), the client terminal 2 stands by for the occurrence of the event. If it is determined that an event occurs instructing the creation of a new tenant (Yes at Step S11), the client terminal 2 opens a dialog box for the tenant definition (Step S12). Then, the client terminal 2 acquires the tenant name from the dialog box (Step S13), and closes the dialog box when an acknowledgement button is pressed down (Step S14). At this time, the client terminal 2 outputs the instruction to create the tenant to the tenant control unit 21 together with the tenant name.

Subsequently, the tenant defining unit 211 of the tenant control unit 21 receives the instruction to create the tenant from the client terminal 2, and defines the tenant relating to the acquired tenant name in the tenant table 11 (Step S15). For example, when the tenant name is "Company A", the tenant control unit 21 automatically allocates the identification ID of the tenant, sets "Company A" to the tenant name, sets the identification ID of the server belonging to the tenant to blank, and stores these in the tenant table 11. As exemplarily illustrated in FIG. 7, the tenant table 11 stores therein the id 11a as "Tenant A", the name 11b as "Company A", and the server_id as "blank".

Thereafter, the client terminal 2 displays the information about the tenant defined by the tenant defining unit 211 on the basis of the tenant table 11 (Step S16). Then, the client terminal 2 ends the processing to define tenant.

Sequence of Processing to Participate in Tenant According to the Embodiment

Figure 8:
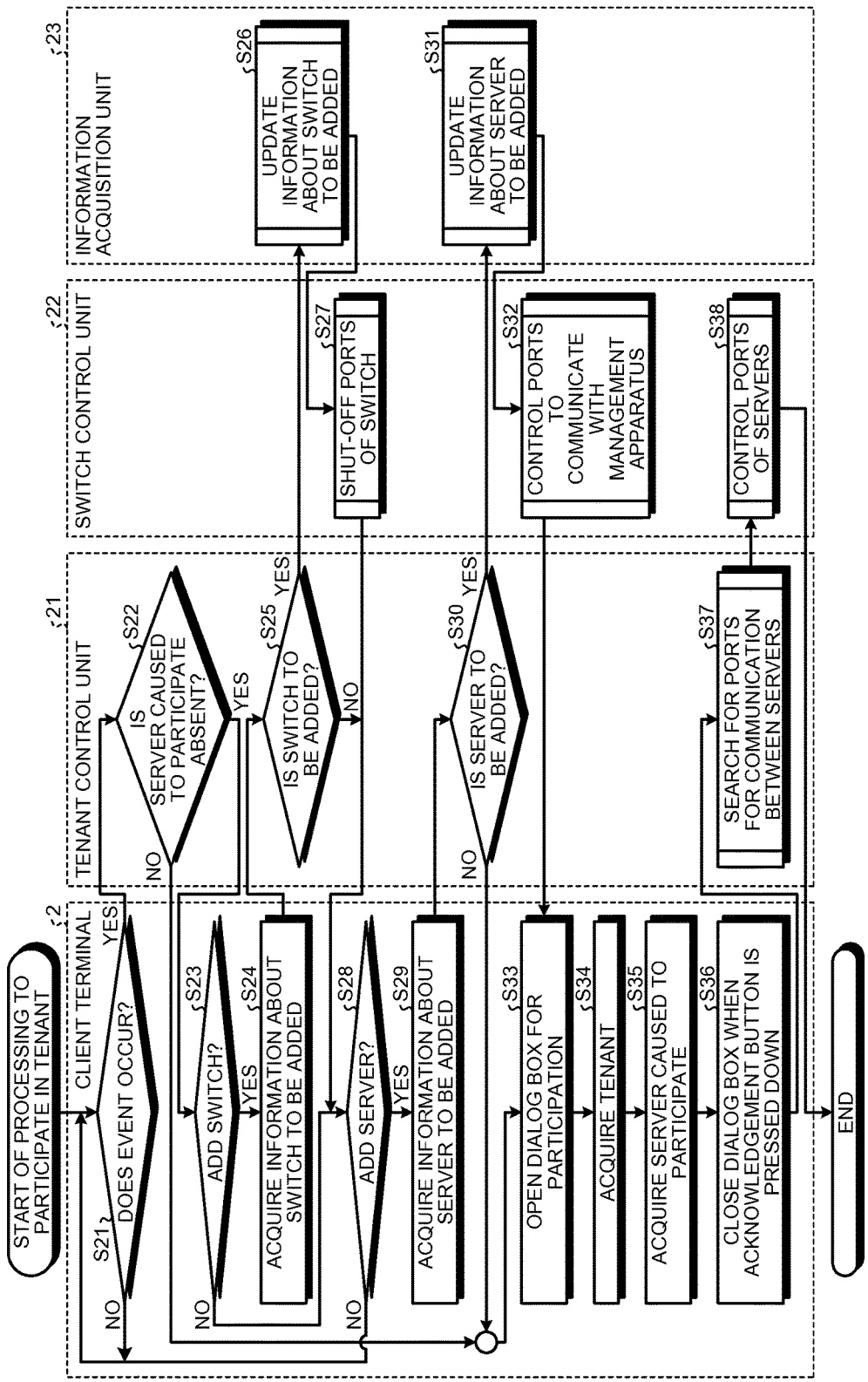
FIG. 8 is a schematic diagram illustrating a sequence of processing to participate in the tenant according to the embodiment.

The following describes a sequence of processing to participate in the tenant according to the embodiment with reference to FIG. 8. FIG. 8 is a schematic diagram illustrating the sequence of the processing to participate in the tenant according to the embodiment.

First, the client terminal 2 determines whether an event occurs instructing the participation in the tenant (Step S21). If it is determined that no event occurs instructing the participation in the tenant (No at Step S21), the client terminal 2 stands by for the occurrence of the event. If it is determined that an event occurs instructing the participation in the tenant (Yes at Step S21), the client terminal 2 outputs the instruction of the participation in the tenant to the tenant control unit 21.

Subsequently, the tenant control unit 21 determines whether the server caused to participate in the tenant is present (Step S22). If it is determined that the server caused to participate in the tenant is present (No at Step S22), the processing proceeds from the tenant control unit 21 to Step S33 of the client terminal 2 so as to designate the server caused to participate in the tenant. If it is determined that the server caused to participate in the tenant is absent (Yes at Step S22), the processing proceeds to Step S23 of the client terminal 2 so as to determine whether the switch is added.

Subsequently, the client terminal 2 determines whether to add a switch (Step S23). If it is determined to add a switch (Yes at Step S23), the client terminal 2 acquires the information about the switch to be added (Step S24). Then, the client terminal 2 outputs the instruction to add the switch to the tenant control unit 21 together with the acquired information. The information about the switch to be added includes the IP address of the switch to be added. If it is determined not to add a switch (No at Step S23), the client terminal 2 proceeds to Step S28 so as to determine whether to add a server.

Subsequently, the switch addition determination unit 212 of the tenant control unit 21 acquires the instruction to add the switch and determines whether the switch is to be added on the basis of the acquired information about the switch (Step S25). If it is determined that the switch is not to be added (No at Step S25), the switch addition determination unit 212 proceeds to Step S28 so as to determine whether to add a server. If it is determined that the switch can be added (Yes at Step S25), the switch addition determination unit 212 requests the additional switch information updating unit 231 to update the information about the switch to be added.

Subsequently, the additional switch information updating unit 231 of the information acquisition unit 23 updates the information about the switch to be added in the switch table 12 and the port table 14 (Step S26). Then, the additional switch information updating unit 231 acquires the information about the switch to be added from the various tables, and hands over the information to the switch control unit 22. The information about the switch to be added includes the IP address, the account name, and the account password of the switch to be added. Then, the port control unit 221 of the switch control unit 22 shuts off all the ports of the switch to be added (Step S27) and proceeds to Step S28 so as to determine whether to add a server.

Subsequently, the client terminal 2 determines whether to add a server (Step S28). If it is determined to add a the server (Yes at Step S28), the client terminal 2 acquires the information about the server to be added (Step S29) and outputs the instruction to add the server together with the acquired information. The information about the server to be added includes the IP address of the server to be added. If it is determined not to add a server (No at Step S28), the client terminal 2 proceeds to Step S21 so as to return the processing to the beginning.

The server addition determination unit 213 of the tenant control unit 21 acquires the instruction to add the server and determines whether the server is to be added on the basis of the acquired information about the server (Step S30). If it is determined that the server is not to be added (No at Step S30), the processing proceeds from the server addition determination unit 213 to Step S33 of the client terminal 2. If it is determined that the server can be added (Yes at Step S30), the server addition determination unit 213 requests the additional server information updating unit 232 to update the information about the server to be added.

Subsequently, the additional server information updating unit 232 of the information acquisition unit 23 updates the information about the server to be added in the server table 13 (Step S31). Then, the additional server information updating unit 232 acquires the information about the server to be added from the various tables, and hands over the information to the switch control unit 22. The information about the server to be added includes the IP address of the server, and the connection destination port, the IP address, the management port, the account name, and the account password of the switch connected to the server. Then, the port control unit 221 of the switch control unit 22 controls the ports used for communication between the server to be added and the network management apparatus 1 (Step S32). Then, the processing proceeds from the port control unit 221 to Step S33 of the client terminal 2 so as to designate the server caused to participate in the tenant.

The client terminal 2 opens the dialog box for the tenant participation (Step S33). Then, the client terminal 2 acquires the identification ID of the tenant serving as the participation target from the dialog box (Step S34) and acquires the identification ID of the server caused to participate (Step S35). When the acknowledgement button is pressed down, the client terminal 2 closes the dialog box (Step S36). At this time, the client terminal 2 outputs the identification ID of the tenant and the identification ID of the server caused to participate to the tenant control unit 21.

Subsequently, the port searching unit 214 of the tenant control unit 21 searches for the connection destination ports that control the communication between the server caused to participate and the servers belonging to the same tenant as the server caused to participate (Step S37). The port searching unit 214 hands over the identification IDs of connection destination ports, the IP addresses, the account names, and the account passwords of the switches, and the IP addresses of both servers to the switch control unit 22.

Then, the port control unit 221 of the switch control unit 22 controls the connection destination ports of the switches so as to allow communication between both servers (Step S38). Then, the client terminal 2 ends the tenant participating processing.

Sequence of processing to withdraw from tenant according to the embodiment

Figure 9:
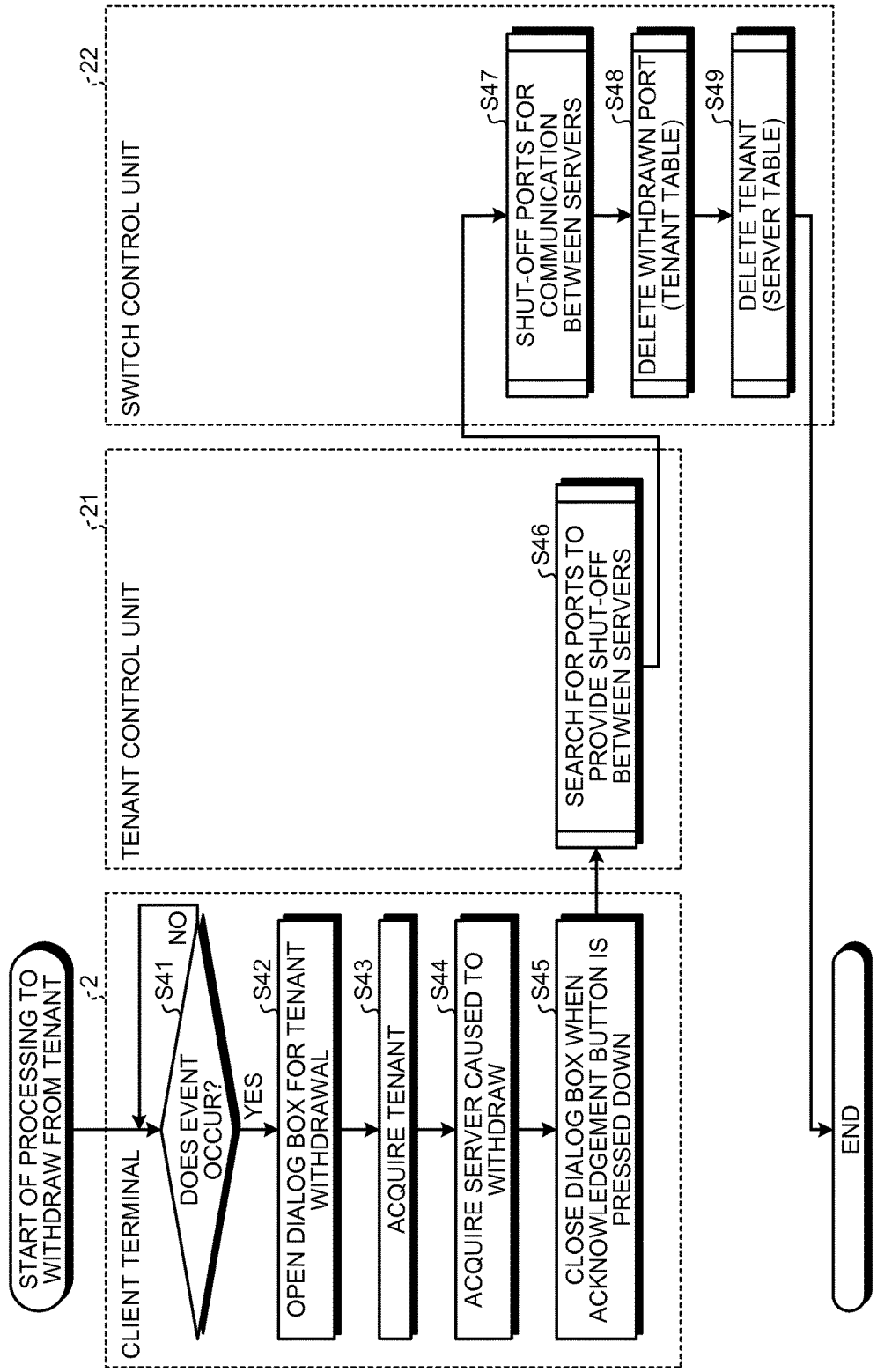
FIG. 9 is a schematic diagram illustrating a sequence of processing to withdraw from the tenant according to the embodiment.

The following describes a sequence of processing to withdraw from the tenant according to the embodiment with reference to FIG. 9. FIG. 9 is a schematic diagram illustrating the sequence of the processing to withdraw from the tenant according to the embodiment.

First, the client terminal 2 determines whether an event occurs instructing the withdrawal from the tenant (Step S41). If it is determined that no event occurs instructing the withdrawal from the tenant (No at Step S41), the client terminal 2 stands by for the occurrence of the event. If it is determined that an event occurs instructing the withdrawal from the tenant (Yes at Step S41), the client terminal 2 opens a dialog box for the tenant withdrawal (Step S42). Then, the client terminal 2 acquires the identification ID of the tenant serving as the withdrawal target from the dialog box (Step S43) and acquires the identification ID of the server caused to withdraw (Step S44). When the acknowledgement button is pressed down, the client terminal 2 closes the dialog box (Step S45). At this time, the client terminal 2 outputs the instruction of the withdrawal from the tenant to the tenant control unit 21 together with the identification ID of the server caused to withdraw.

Subsequently, the withdrawal server acquisition unit 215 acquires the instruction of the withdrawal from the tenant, acquires the switch connected to the server having the acquired identification ID, and searches for the respective ports of the acquired switch (Step S46). Then, the withdrawal server acquisition unit 215 hands over the identification IDs of the respective ports including the management port, the IP address, the account name, and the account password of the switch to the switch control unit 22.

Subsequently, the port shut-off unit 222 of the switch control unit 22 shuts off the respective ports of the switch so as to disallow communication between the server caused to withdraw and the servers belonging to the same tenant as the server caused to withdraw (Step S47). Then, the port shut-off unit 222 deletes the identification ID of the withdrawn server from the tenant table 11 (Step S48). In addition, the port shut-off unit 222 deletes the identification ID of the tenant corresponding to the withdrawn server from the server table 13 (Step S49). Then, the client terminal 2 ends the tenant withdrawal processing.

Figure 10:
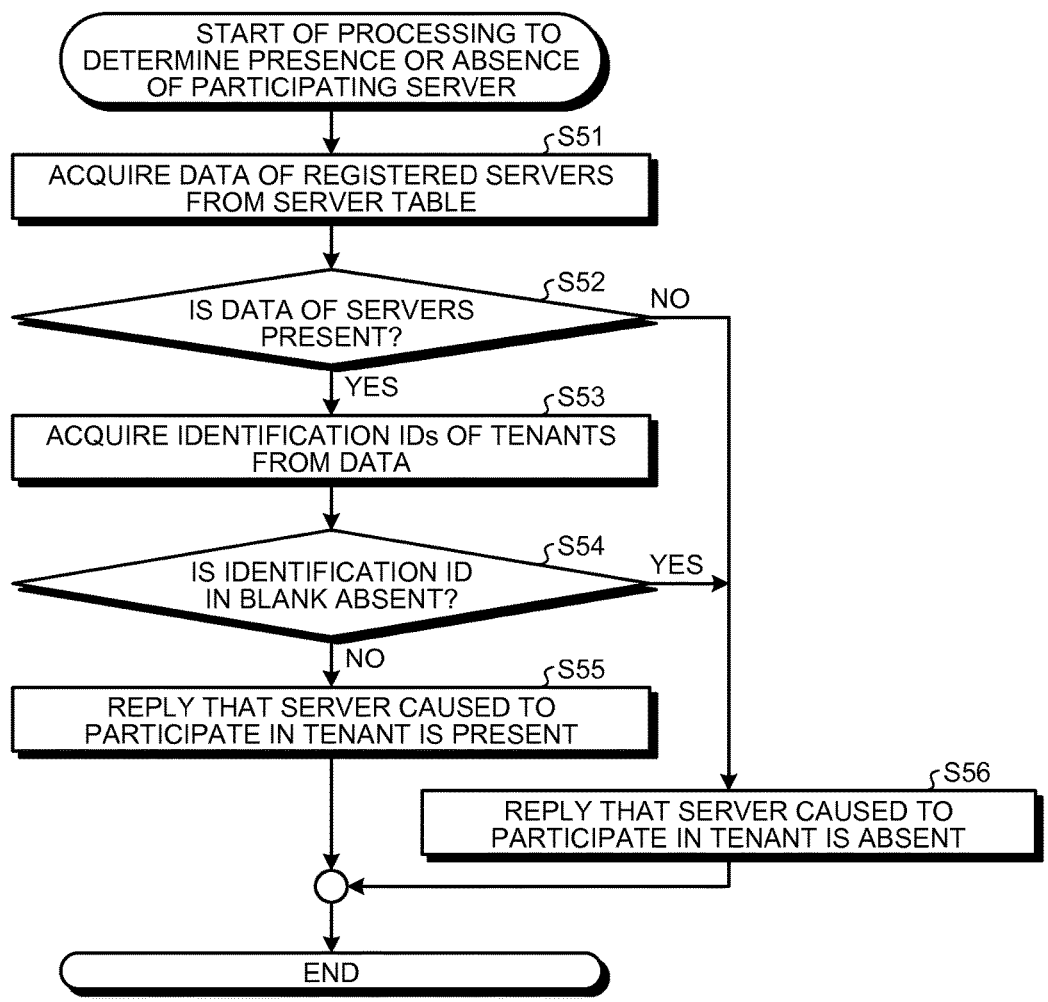
FIG. 10 is a flowchart illustrating processing to determine the presence or absence of a participating server according to the embodiment.

Flowchart of Processing to Determine Presence or Absence of Participating Server According to the Embodiment The following describes the processing procedure at S22, at which the presence or absence of a server caused to participate is determined, illustrated in FIG. 8 with reference to FIG. 10. FIG. 10 is a flowchart illustrating processing to determine the presence or absence of a server caused to participate according to the embodiment.

First, the tenant control unit 21 acquires the data of the registered servers from the server table 13 (Step S51). Subsequently, the tenant control unit 21 determines whether the data of the registered servers is present (Step S52). If it is determined that the data of the registered servers is present (Yes at Step S52), the tenant control unit 21 acquires the identification IDs of the tenants from the acquired data (Step S53).

Subsequently, the tenant control unit 21 determines whether the identification ID in blank is absent (Step S54). If it is determined that the identification ID in blank is present (No at Step S54), the tenant control unit 21 replies that a server caused to participate in the tenant is present (Step S55). If it is determined that the identification ID in blank is absent (Yes at Step S54) or no data of the registered servers is present (No at Step S52), the tenant control unit 21 replies that a server is caused to participate in the tenant is absent (Step S56).

Figure 11:
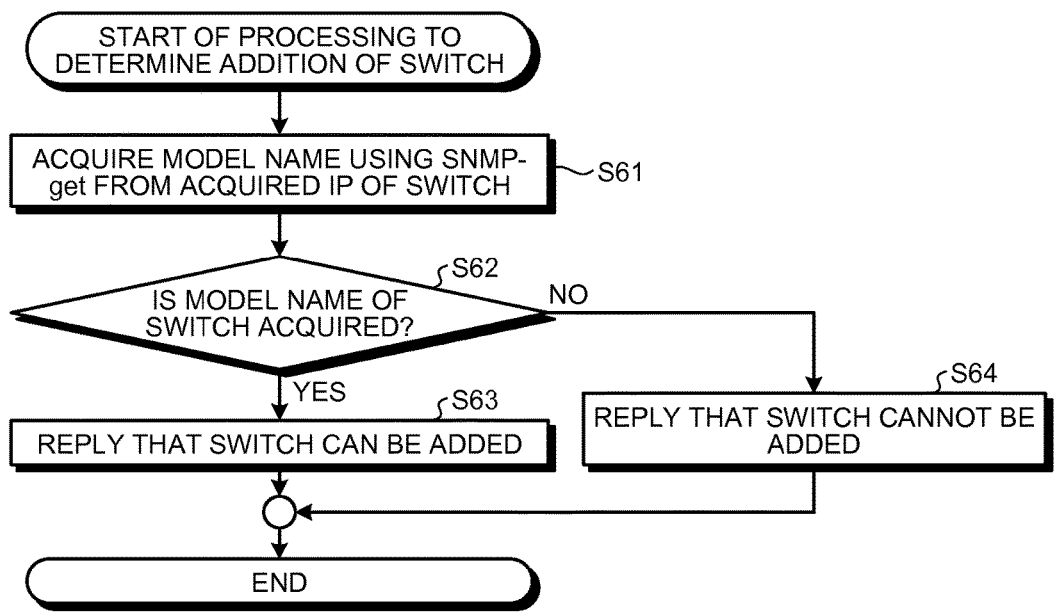
FIG. 11 is a flowchart illustrating processing to determine the addition of a switch according to the embodiment.

Flowchart of Processing to Determine Addition of Switch According to the Embodiment The following describes the processing procedure at S25, at which whether the switch can be added is determined, illustrated in FIG. 8 with reference to FIG. 11. FIG. 11 is a flowchart illustrating processing to determine the addition of the switch according to the embodiment.

First, the switch addition determination unit 212 acquires the IP address of the switch to be added from the client terminal 2. Then, the switch addition determination unit 212 acquires the model name using the SNMP-get from the acquired IP address of the switch (Step S61). The switch addition determination unit 212 determines whether the model name of the switch is acquired (Step S62). If it is determined that the model name of the switch is acquired (Yes at Step S62), the switch addition determination unit 212 replies that the switch can be added (Step S63). If it is determined that the model name of the switch is not acquired (No at Step S62), the switch addition determination unit 212 replies that the switch cannot be added (Step S64).

Figure 12:
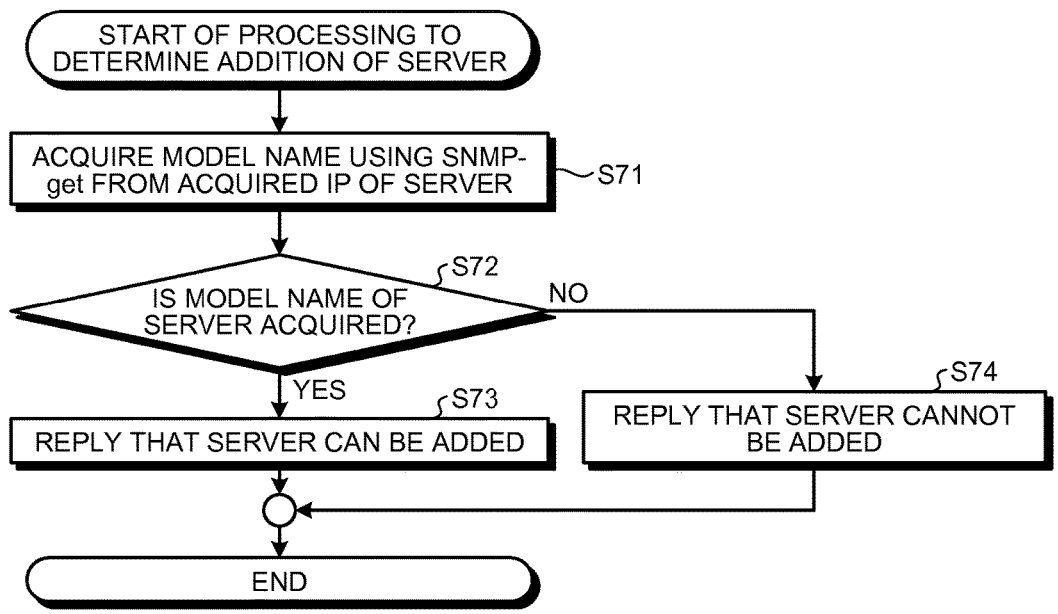
FIG. 12 is a flowchart illustrating processing to determine the addition of a server according to the embodiment.

Flowchart of Processing to Determine Addition of Server According to the Embodiment The following describes the processing procedure at S30, at which whether the server can be added is determined, illustrated in FIG. 8 with reference to FIG. 12. FIG. 12 is a flowchart illustrating processing to determine the addition of the server according to the embodiment.

First, the server addition determination unit 213 acquires the IP address of the server to be added from the client terminal 2. Then, the server addition determination unit 213 acquires the model name using the SNMP-get from the acquired IP address of the server (Step S71). The server addition determination unit 213 determines whether the model name of the server is acquired (Step S72). If it is determined that the model name of the server is acquired (Yes at Step S72), the server addition determination unit 213 replies that the server can be added (Step S73). If it is determined that the model name of the server is not acquired (No at Step S72), the server addition determination unit 213 replies that the server cannot be added (Step S74).

Figure 13:
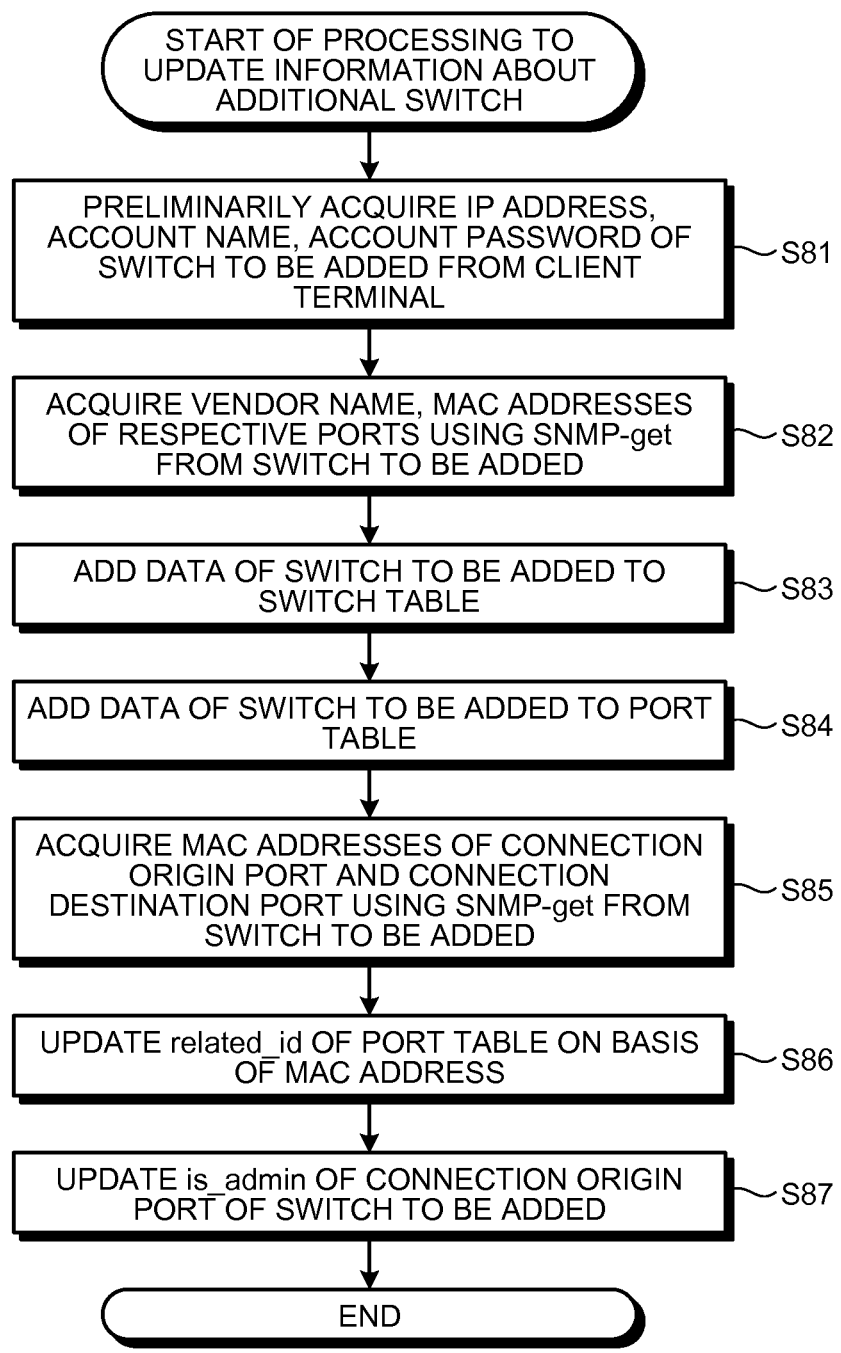
FIG. 13 is a flowchart illustrating processing to update information about an additional switch according to the embodiment.

Flowchart of Processing to Update Information about Additional Switch According to the Embodiment The following describes the processing procedure at S26, at which the information about the switch to be added is updated, illustrated in FIG. 8 with reference to FIG. 13. FIG. 13 is a flowchart illustrating processing to update information about the additional switch according to the embodiment. In the explanation of the processing to update information about the additional switch, FIGS. 14A and 14B are referred to. FIG. 14A is a schematic diagram illustrating a specific example of an updating of the switch table. FIG. 14B is a schematic diagram illustrating a transition of the port table.

First, the additional switch information updating unit 231 preliminarily acquires the IP address, the account name, and the account password of the switch to be added from the client terminal 2 (Step S81). Then, the additional switch information updating unit 231 acquires the vendor name of the switch and the MAC addresses of the respective ports using the SNMP-get from the switch to be added (Step S82).

Subsequently, the additional switch information updating unit 231 adds the data of the switch to be added to the switch table 12 (Step S83). For example, the additional switch information updating unit 231 automatically allocates the identification ID of the switch, produces data together with the acquired vendor name, IP address, account name, and account password, together with the identification ID, and adds the produced data to the switch table 12. As exemplarily illustrated in FIG. 14A, the switch table 12 stores therein the id (12a) as "Switch A", the vendor (12b) as "V1", and the ip_address (12c) as "1.1.1.1". In addition, the switch table 12 stores therein the account_name (12d) as "admin" and the account_password (12e) as "admin".

Subsequently, the additional switch information updating unit 231 adds the data of the switch to be added to the port table 14 (Step S84). For example, the additional switch information updating unit 231 automatically allocates the identification IDs of the respective ports as many as the number of MAC addresses of the ports, and adds the identification ID of the switch and the MAC address of the port to the port table 14 for each identification ID of the port. At this time, the additional switch information updating unit 231 stores the flag identifying the management port as "false" indicating that the port is not the management port, and the connection destination of the port as blank in the port table 14. As exemplarily illustrated in FIG. 14B, the switch identification ID which is "Switch A" has three ports. The port table 14 stores therein data (r1) including the identification ID of "Port A1", data (r2) including the identification ID of "Port A2", and data (r3) including the identification ID of "Port A3".

Subsequently, the additional switch information updating unit 231 acquires the MAC address of the connection origin port and the MAC address of the connection destination device using the SNMP-get from the switch to be added (Step S85). The additional switch information updating unit 231 updates the related_id (14e) of the port table 14 on the basis of the acquired MAC address (Step S86). For example, the additional switch information updating unit 231 searches for the identification ID corresponding to the MAC address of the connection destination device in the port table 14. The additional switch information updating unit 231 also searches for the identification ID corresponding to the MAC address of the connection origin port in the port table 14. Then, the additional switch information updating unit 231 updates the port table 14 such that the identification ID of the connection destination device is set to the related_id (14e) corresponding to the identification ID of the connection origin port. As exemplarily illustrated in FIG. 14B, the port table 14 stores "Server A", which is indicated with a numeral c1, in the related_id (14e) of the data including "Port A1" as the identification ID of the port.

Then, the additional switch information updating unit 231 updates the is_admin (14d) corresponding to the connection origin port of the switch to be added of the port table 14 (Step S87). For example, the additional switch information updating unit 231 stores "true", which indicates that the port is the management port, in the is_admin (14d) of the acquired connection origin port in the port table 14. As exemplarily illustrated in FIG. 14B, the port table 14 stores "true", which is indicated with a numeral c2, in the is_admin (14d) of the data including "Port A3" as the identification ID of the port.

Flowchart of Processing to Shut Off Ports of Switch According to the Embodiment

Figure 15:
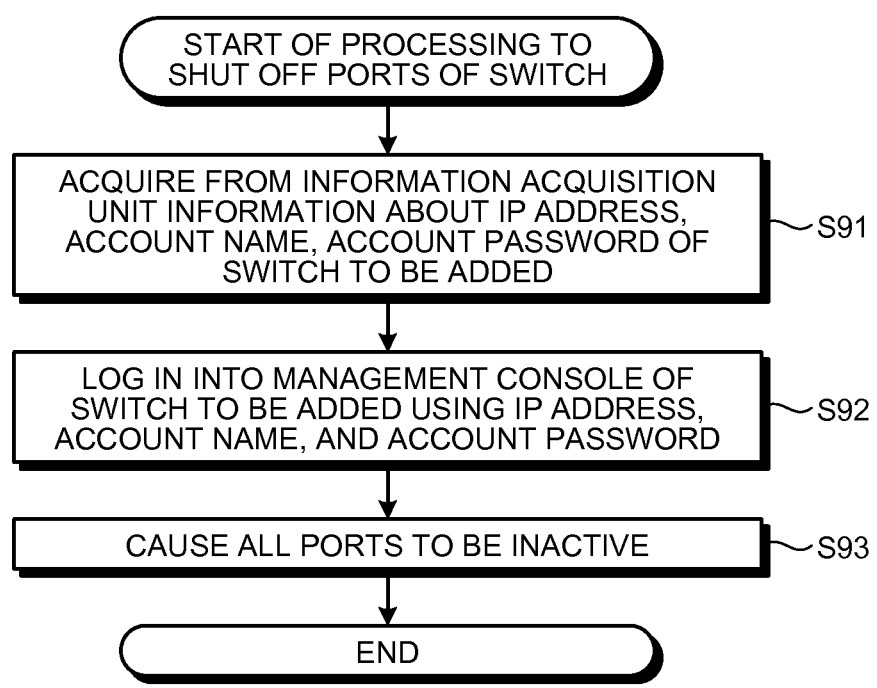
FIG. 15 is a flowchart illustrating processing to shut off ports of the switch according to the embodiment.

The following describes the processing procedure at S27, at which the ports of the switch are shut off, illustrated in FIG. 8 with reference to FIG. 15. FIG. 15 is a flowchart illustrating processing to shut off ports of the switch according to the embodiment.

First, the port control unit 221 acquires the information about the IP address, the account name, and the account password of the switch to be added from the additional switch information updating unit 231 of the information acquisition unit 23 (Step S91). Then, the port control unit 221 logs in into a management console of the switch to be added using the acquired IP address, account name, and account password (Step S92). Thereafter, the port control unit 221 causes all ports to be inactive through the switch management LAN 4 so as to shut off the communication of the switch to be added (Step S93).

Figure 16:
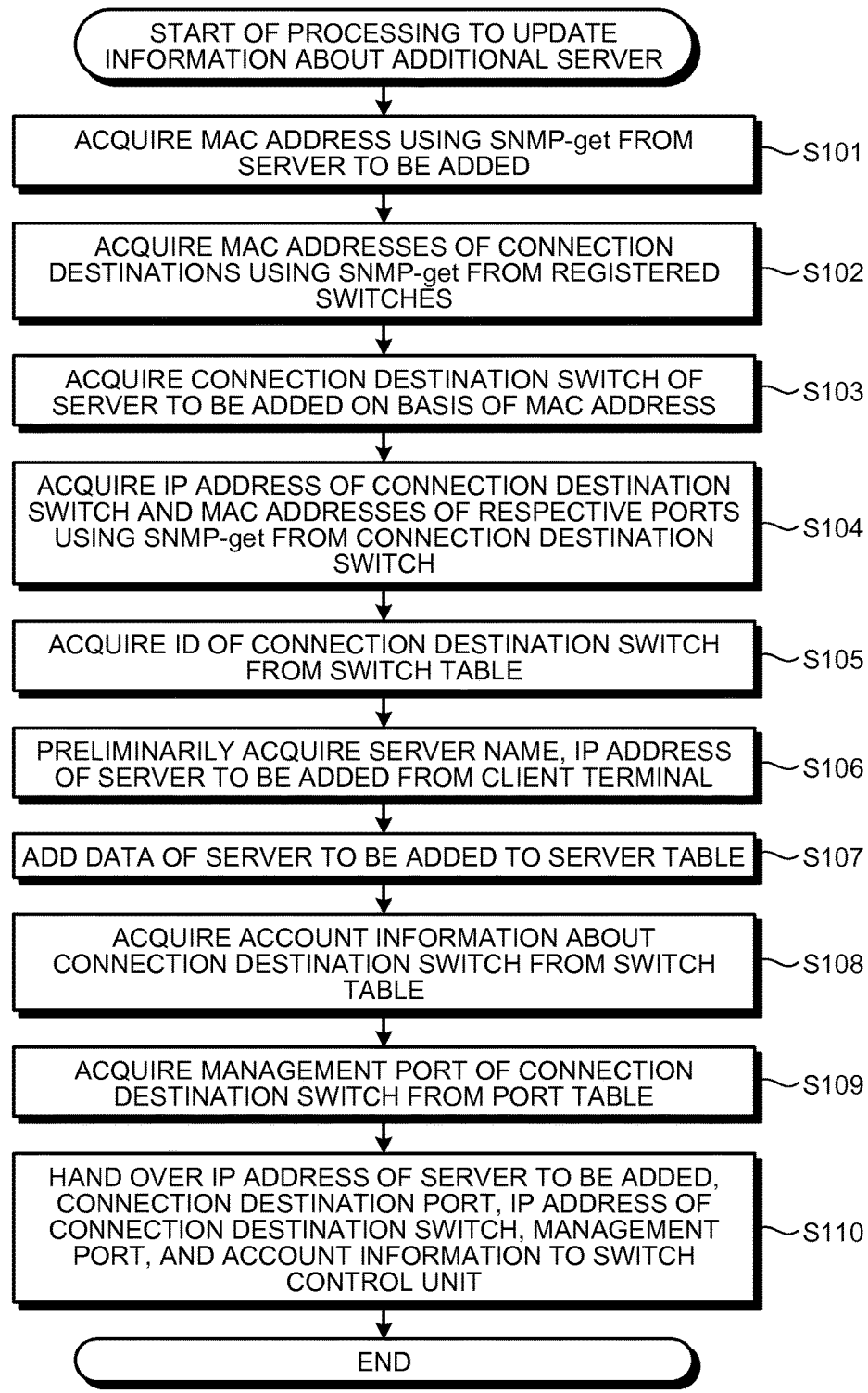
FIG. 16 is a flowchart illustrating processing to update information about an additional server according to the embodiment.
Figures 17, 18:
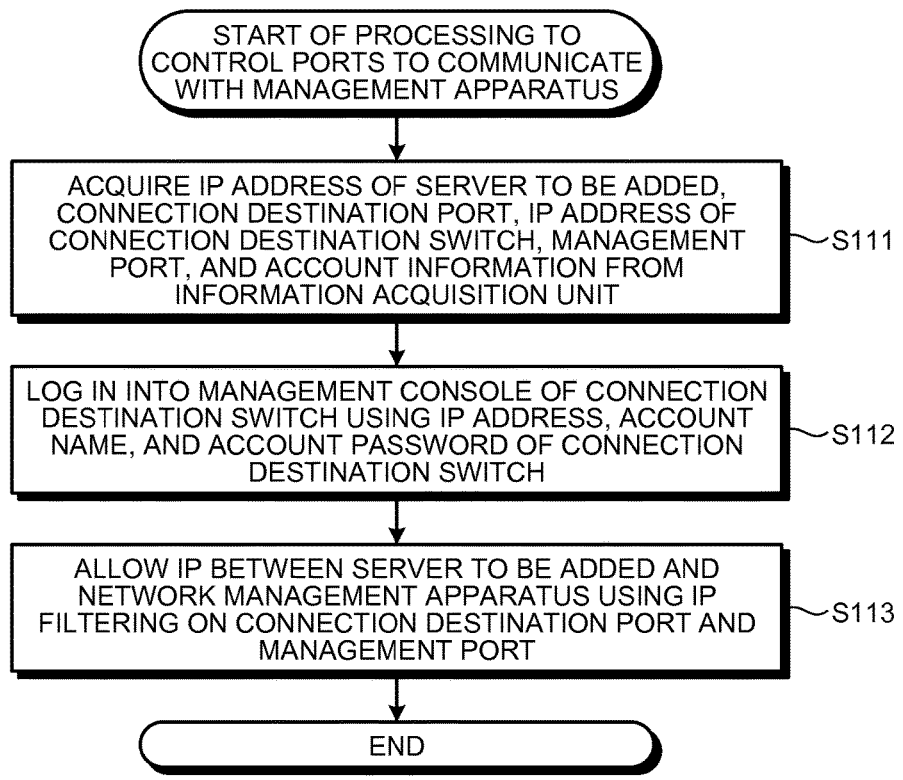
FIG. 17 is a schematic diagram illustrating a specific example of the addition of the server table.
FIG. 18 is a flowchart illustrating processing to control ports to communicate with a management apparatus according to the embodiment.

Flowchart of Processing to Update Information about Additional Server According to the Embodiment The following describes the processing procedure at S31, at which the information about the server to be added is updated, illustrated in FIG. 8 with reference to FIG. 16. FIG. 16 is a flowchart illustrating processing to update information about the additional server according to the embodiment. In the explanation of the processing to update information about the additional server, FIG. 17 is referred to. FIG. 17 is a schematic diagram illustrating a specific example of the addition of the server table.

First, the additional server information updating unit 232 acquires the MAC address using the SNMP-get from the server to be added (Step S101). The additional server information updating unit 232 acquires the MAC addresses of the connection destinations connected to the switches using the SNMP-get from the registered switches in the switch table 12 (Step S102). Then, the additional server information updating unit 232 compares the MAC address of the server to be added with the MAC addresses of the connection destinations connected to the registered switches, and acquires the switch the MAC address of which is the same as the server to be added as the connection destination switch (Step S103).

Subsequently, the additional server information updating unit 232 acquires the IP address of the connection destination switch and the MAC addresses of the respective ports using the SNMP-get from the connection destination switch (Step S104). The additional server information updating unit 232 acquires the identification ID of the connection destination switch corresponding to the IP address of the connection destination switch on the basis of the switch table 12 (Step S105). Then, the additional server information updating unit 232 preliminarily acquires the server name and IP address of the server to be added from the client terminal 2 (Step S106).

Then, the additional server information updating unit 232 adds the data of the server to be added to the server table 13 (Step S107). For example, the additional server information updating unit 232 automatically allocates the identification ID of the server. The additional server information updating unit 232 acquires the MAC address of the connection destination port of the switch connected to the server using the SNMP-get from the IP address of the server to be added. Then, the additional server information updating unit 232 acquires the identification ID of the port corresponding to the acquired MAC address as the identification ID of the connection destination port on the basis of the port table 14. The additional server information updating unit 232 produces the data including the identification ID of the server, the server name, the IP address, and the identification ID of the connection destination port, and adds the produced data to the server table 13. As exemplarily illustrated in FIG. 17, the server table 13 stores therein the id (13a) as "Server A", the name (13b) as "sv A", and the ip_address (13c) as "1.1.1.4". In addition, the server table 13 stores therein the tenant_id (13d) as blank, the related_id (13e) as "Port A1", and the mac_address (13f) as "11:11:11:11:11:11".

Subsequently, the additional server information updating unit 232 acquires the account information corresponding to the identification ID of the connection destination switch on the basis of the switch table 12 (Step S108). The account information indicates the account name and the account password. Then, the additional server information updating unit 232 acquires the identification ID of the management port corresponding to the identification ID of the connection destination switch on the basis of the port table 14 (Step S109). Then, the additional server information updating unit 232 hands over the IP address of the server to be added, the identification ID of the connection destination port, the IP address of the connection destination switch, and the identification ID and the account information of the management port to the switch control unit 22 (Step S110).

Flowchart of Processing to Control Ports to Communicate with Management Apparatus According to the Embodiment The following describes the processing procedure at S32, at which port control is performed so as to communicate with the management apparatus, illustrated in FIG. 8 with reference to FIG. 18. FIG. 18 is a flowchart illustrating processing to control ports to communicate with the management apparatus according to the embodiment.

First, the port control unit 221 acquires the IP address of the server to be added, the identification ID of the connection destination port, the IP address of the connection destination switch, and the identification ID and the account information of the management port from the additional server information updating unit 232 of the information acquisition unit 23 (Step S111). The account information indicates the account name and the account password. Then, the port control unit 221 logs in into the management console of the connection destination switch through the switch management LAN 4 using the IP address, the account name, and the account password of the connection destination switch (Step S112).

Thereafter, the port control unit 221 allows the IPs of the server to be added and the network management apparatus 1 using the IP filtering on the connection destination port and the management port (Step S113). That is, the port control unit 221 allows the server to be added to communicate only with the network management apparatus 1.

Figure 19:
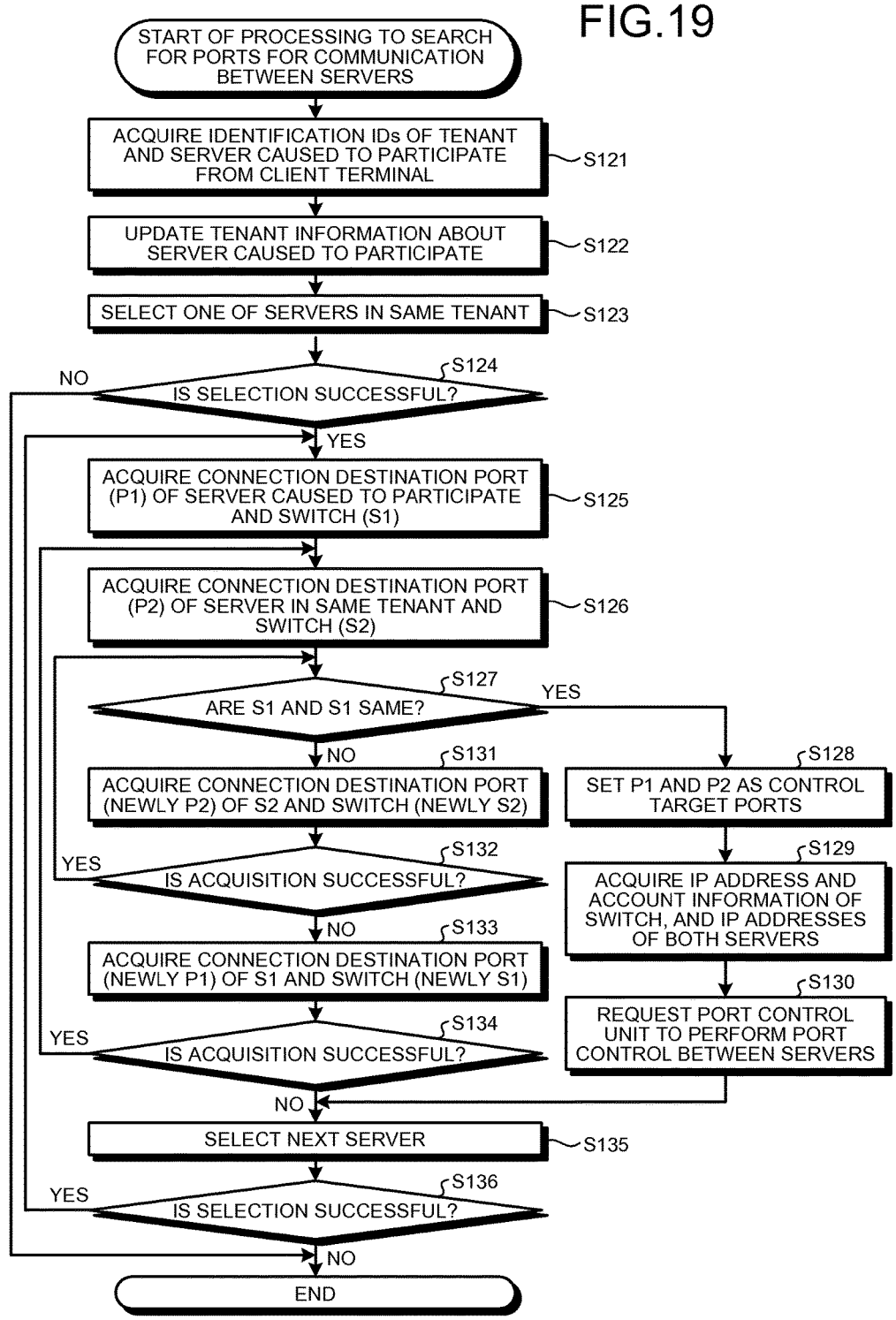
FIG. 19 is a flowchart illustrating processing to search for ports for communication between servers according to the embodiment.

Flowchart of Processing to Search for Ports for Communication Between Servers According to the Embodiment The following describes the processing procedure at S37, at which the ports controlling communication between the servers are searched for, illustrated in FIG. 8 with reference to FIG. 19. FIG. 19 is a flowchart illustrating processing to search for ports for communication between servers according to the embodiment. In the explanation of the processing to search for ports for communication between servers, FIGS. 20A and 20B are referred to. FIG. 20A is a schematic diagram illustrating a specific example of an updating of the server table. FIG. 20B is a schematic diagram illustrating a specific example of an updating of the tenant table.

First, the port searching unit 214 acquires from the client terminal 2 the identification ID of the tenant and the identification ID of the server caused to participate (Step S121). Then, the port searching unit 214 updates the tenant information about the server caused to participate (Step S122). For example, the port searching unit 214 stores the acquired identification ID of the tenant in the tenant_id 13d corresponding to the identification ID of the server caused to participate in the server table 13. In addition, the port searching unit 214 stores the acquired identification ID of the server in the server_id 11c corresponding to the identification ID of the tenant in the tenant table 11. As exemplarily illustrated in FIG. 20A, the server table 13 stores "Company A", which is indicated with a numeral c3, in the tenant_id 13d of the data including "Server A" as the ID of the server. As illustrated in FIG. 20B, the tenant table 11 stores "Server A", which is indicated with a numeral c4, in the server_id 11c of the data including "Tenant A" as the ID of the tenant.

Then, the port searching unit 214 selects one of the identification IDs of the servers belonging to the tenant having the same identification ID as the acquired tenant on the basis of the tenant table 11 and the server table 13 (Step S123). For example, the port searching unit 214 acquires the identification IDs of the servers corresponding to the identification ID of the tenant from the tenant table 11. Then, the port searching unit 214 selects one identification ID of the server out of the acquired identification IDs of servers and acquires the data corresponding to the selected identification ID from the server table 13.

Subsequently, the port searching unit 214 determines whether the selection is successful (Step S124). If it is determined that the selection is unsuccessful, e.g., in a case where no identification IDs of the servers are stored in the tenant table 11, (No at Step S124), the port searching unit 214 ends the processing. If it is determined that the selection is successful (Yes at Step S124), the port searching unit 214 acquires the identification ID of the connection destination port of the server caused to participate and the identification ID of the switch on the basis of the server table 13 and the port table 14 (Step S125). For example, the port searching unit 214 refers to the related_id (13e) corresponding to the identification ID of the server caused to participate in the server table 13, and acquires the identification ID of the connection destination port of the server. Then, the port searching unit 214 refers to the switch_id (14b) corresponding to the identification ID of the connection destination port in the port table 14, and acquires the identification ID of the switch of the connection destination port. The following description is made by defining the identification ID of the connection destination port as P1 and the identification ID of the switch as S1, for example.

The port searching unit 214 acquires the identification ID (e.g., P2) of the connection destination port of the server in the same tenant and the identification ID (e.g., S2) of the switch on the basis of the server table 13 and the port table (Step S126). Then, the port searching unit 214 determines whether the switch S1 and the switch S2 are the same (Step S127). If it is determined that the switches S1 and S2 are the same (Yes at Step S127), the port searching unit 214 sets the identification ID (P1) of the connection destination port and the identification ID (P2) of the connection destination port as the control target ports (Step S128).

Then, the port searching unit 214 acquires the IP address and the account information of the switch S1 on the basis of the switch table 12. The port searching unit 214 acquires the IP addresses of both servers on the basis of the server table 13 (Step S129). Then, the port searching unit 214 hands over the acquired information to the port control unit 221 so as to cause the port control unit 221 to control the control target ports (P1 and P2) of the switches (S1) and requests the port control unit 221 to perform port control between the servers (Step S130). When receiving a notification of completion of the processing from the port control unit 221, the port searching unit 214 proceeds to Step S135.

If the switches S1 and S2 are not the same (No at Step S127), the port searching unit 214 acquires the identification ID of the connection destination port of the switch S2 and the identification ID of the switch thereof on the basis of the port table 14 (Step S131). The following description is made by newly defining the identification ID of the connection destination port of the switch S2 as P2 and the identification ID of the switch thereof as S2 . The port searching unit 214 determines whether the acquisition of the new connection destination port P2 and the switch S2 thereof is successful (Step S132). If it is determined that the acquisition is successful (Yes at Step S132), the port searching unit 214 proceeds to Step S127 so as to determine whether the switches are the same.

If it is determined that the acquisition is unsuccessful (No at Step S132), the port searching unit 214 acquires the connection destination port (newly defined as P1) of the switch S1 and the switch thereof (newly defined as S1) on the basis of the port table 14 (Step S133). The port searching unit 214 determines whether the acquisition of the new connection destination port P1 and the switch S1 thereof is successful (Step S134). If it is determined that the acquisition is successful (Yes at Step S134), the port searching unit 214 proceeds to Step S126 so as to acquire the server in the same tenant.

If it is determined that the acquisition is unsuccessful (No at Step S134), the port searching unit 214 selects the next one of the servers belonging to the tenant having the same ID as the acquired tenant on the basis of the tenant table 11 and the server table 13 (Step S135). Then, the port searching unit 214 determines whether the selection is successful (Step S136). If it is determined that the selection is successful (Yes at Step S136), the port searching unit 214 proceeds to Step S125 so as to perform the processing on the selected next server. If it is determined that the selection is unsuccessful (No at Step S136), the port searching unit 214 ends the processing.

Flowchart of Processing to Control Ports of Servers According to the Embodiment

Figure 21:
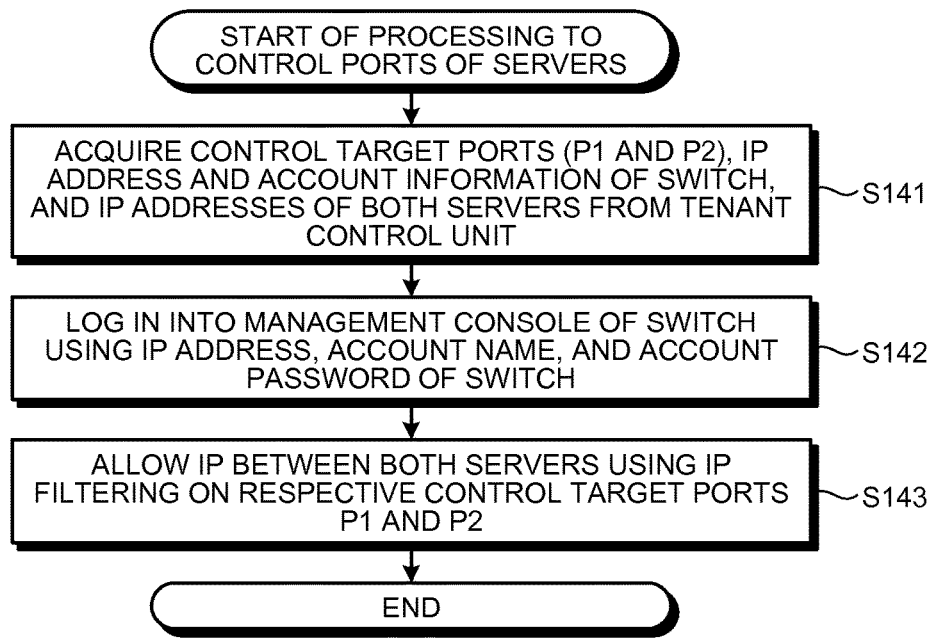
FIG. 21 is a flowchart illustrating processing to control ports of servers according to the embodiment.

The following describes the processing procedure at S38, at which the ports of the servers are controlled, illustrated in FIG. 8 with reference to FIG. 21. FIG. 21 is a flowchart illustrating processing to control the ports of the servers according to the embodiment.

First, the port control unit 221 acquires the identification IDs (P1 and P2) of the control target ports, the IP addresses, the account names, and the account passwords of the switches, and the IP addresses of both servers from the port searching unit 214 of the tenant control unit 21 (Step S141). Both servers mean the server caused to participate and the server belonging to the same tenant as the server caused to participate. Then, the port control unit 221 logs in into the management consoles of the respective switches through the switch management LAN 4 using the IP addresses, the account names, and the account passwords of the respective switches (Step S142).

Thereafter, the port control unit 221 allows the IPs of both servers using the IP filtering on the respective identification IDs (P1 and P2) of the control target ports (Step S143). That is, the port control unit 221 allows the server caused to participate to communicate only with the server belonging to the same tenant.

Figure 22:
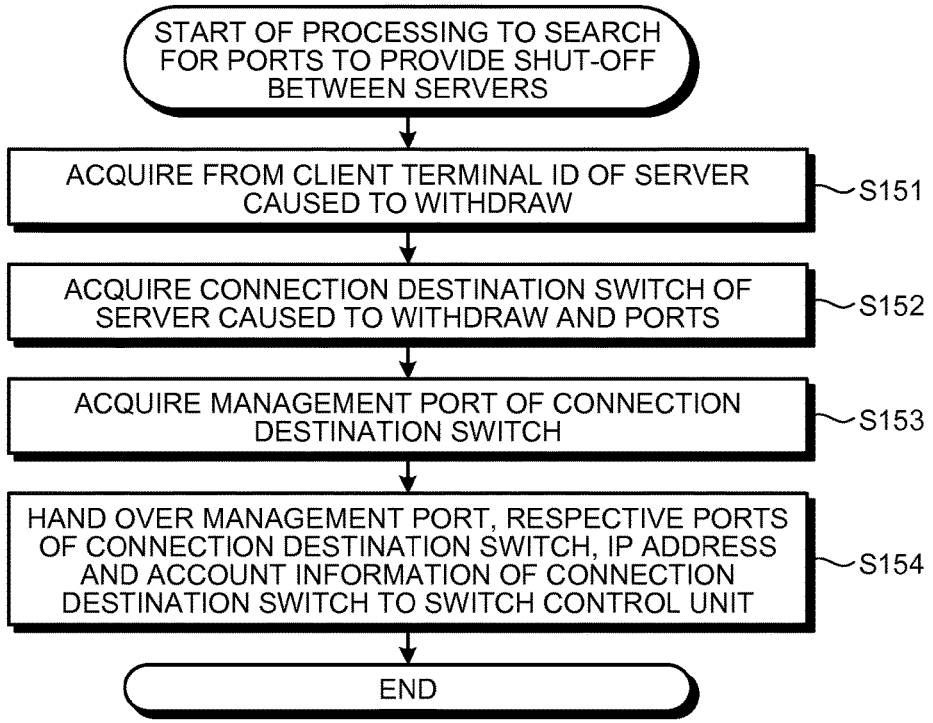
FIG. 22 is a flowchart illustrating processing to search for ports to provide a shut-off between servers according to the embodiment.

Flowchart of Processing to Search for Ports to Provide a Shut-Off Between Servers According to the Embodiment The following describes the processing procedure at S46, at which the ports controlling the shut-off between the servers are searched for, illustrated in FIG. 9 with reference to FIG. 22. FIG. 22 is a flowchart illustrating processing to search for ports to provide a shut-off between the servers according to the embodiment.

First, the withdrawal server acquisition unit 215 acquires from the client terminal 2 the identification ID of the server caused to withdraw (Step S151). Then, the withdrawal server acquisition unit 215 acquires the identification ID of the connection destination switch of the server caused to withdraw and the identification IDs of the respective ports thereof (Step S152). For example, the withdrawal server acquisition unit 215 refers to the related_id 13e corresponding to the identification ID of the server caused to withdraw in the server table 13, and acquires the identification ID of the port of the switch connected to the server caused to withdraw. The withdrawal server acquisition unit 215 refers to the switch_id 14b corresponding to the identification ID of the acquired port in the port table 14, and acquires the identification ID of the switch connected to the server caused to withdraw. Furthermore, the withdrawal server acquisition unit 215 refers to the id 14a corresponding to the identification ID of the acquired port in the port table 14, and acquires the identification IDs of the respective ports of the switch connected to the server caused to withdraw.

Subsequently, the withdrawal server acquisition unit 215 acquires the identification ID of the management port of the connection destination switch on the basis of the port table 14 (Step S153). For example, the withdrawal server acquisition unit 215 refers to the related_id 14e corresponding to the is_admin 14d the value of which is "true" and that corresponds to the identification ID of the acquired switch in the port table 14, and acquires the identification ID of the management port. The withdrawal server acquisition unit 215 also acquires the IP address and the account information of the connection destination switch on the basis of the switch table 12.

Then, the withdrawal server acquisition unit 215 hands over the acquired identification ID of the management port, identification IDs of the respective ports of the connection destination switch, IP address and account information of the connection destination switch to the switch control unit 22 (Step S154).

Figure 23:
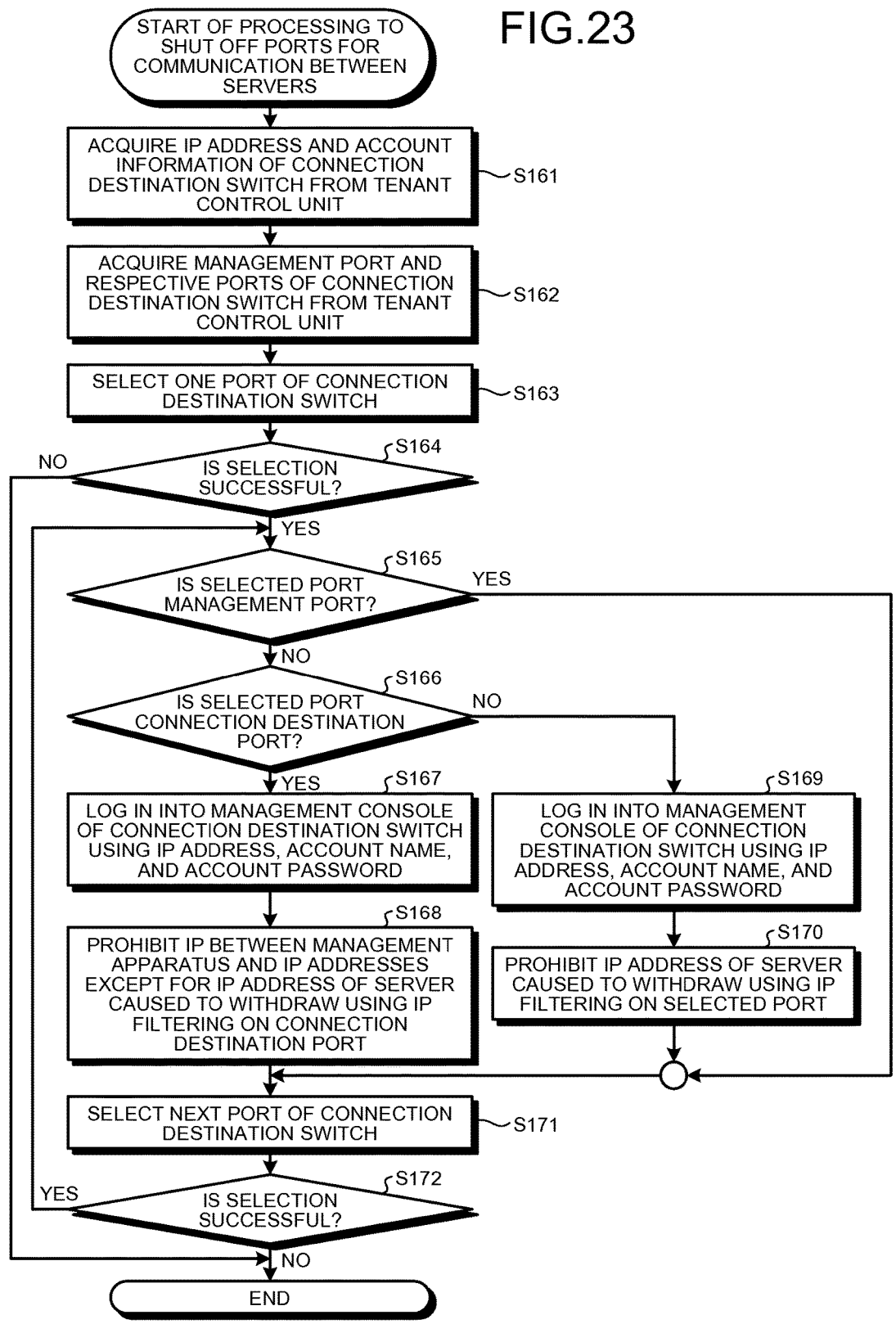
FIG. 23 is a flowchart illustrating processing to shut off ports for communication between servers according to the embodiment.

Flowchart of Processing to Shut Off Ports for Communication Between Servers According to the Embodiment The following describes the processing procedure at S47, at which the ports for communication between the servers are shut off, illustrated in FIG. 9 with reference to FIG. 23. FIG. 23 is a flowchart illustrating processing to shut off ports for communication between the servers according to the embodiment.

First, the port shut-off unit 222 acquires the IP address and the account information of the connection destination switch connected to the server caused to withdraw from the tenant from the withdrawal server acquisition unit 215 of the tenant control unit 21 (Step S161). The port shut-off unit 222 acquires the identification ID of the management port of the connection destination switch and the identification IDs of the respective ports of the connection destination switch from the withdrawal server acquisition unit 215 of the tenant control unit 21 (Step S162).

Then, the port shut-off unit 222 selects one of the acquired identification IDs of the respective ports of the connection destination switch (step S163). Then, the port shut-off unit 222 determines whether the selection is successful (Step S164). If it is determined that the selection is unsuccessful (No at Step S164), the port shut-off unit 222 ends the processing. If it is determined that the selection is successful (Yes at Step S164), the port shut-off unit 222 determines whether the selected port is the management port (Step S165).

If it is determined that the selected port is the management port (Yes at Step S165), the port shut-off unit 222 proceeds to Step S171 without performing the IP filtering on the management port. If it is determined that the selected port is not the management port (No at Step S165), the port shut-off unit 222 determines whether the selected port is the connection destination port (Step S166).

If it is determined that the selected port is the connection destination port (Yes at Step S166), the port shut-off unit 222 logs in into the management console of the switch using the IP address, the account name, and the account password of the connection destination switch (Step S167). The port shut-off unit 222 logs in into the connection destination switch through the switch management LAN 4. Thereafter, the port shut-off unit 222 prohibits the IPs other than the network management apparatus 1 and the IP address of the server caused to withdraw using the IP filtering on the connection destination port (Step S168). That is, the port shut-off unit 222 shuts off communication of the server caused to withdraw with the servers except for the network management apparatus 1. Then, the port shut-off unit 222 proceeds to Step S171.

If it is determined that the selected port is not the connection destination port (No at Step S166), the port shut-off unit 222 logs in into the management console of the switch using the IP address, the account name, and the account password of the connection destination switch (Step S169). The port shut-off unit 222 logs in into the connection destination switch through the switch management LAN 4. Thereafter, the port shut-off unit 222 prohibits the IP address of the server caused to withdraw using the IP filtering on the selected port (Step S170). That is, the port shut-off unit 222 shuts off the communication of the server that is other than the server caused to withdraw and is connected to the connection destination switch with the server caused to withdraw. Then, the port shut-off unit 222 proceeds to Step S171.

Then, the port shut-off unit 222 selects one identification ID of the next port out of the respective ports of the connection destination switch (Step S171). Then, the port shut-off unit 222 determines whether the selection is successful (Step S172). If it is determined that the selection is successful (Yes at Step S172), the port shut-off unit 222 proceeds to Step S165 so as to perform the processing on the selected next port. If it is determined that the selection is unsuccessful (No at Step S172), the port shut-off unit 222 ends the processing.

Flowchart of Processing to Delete Withdrawn Server According to the Embodiment

Figure 24:
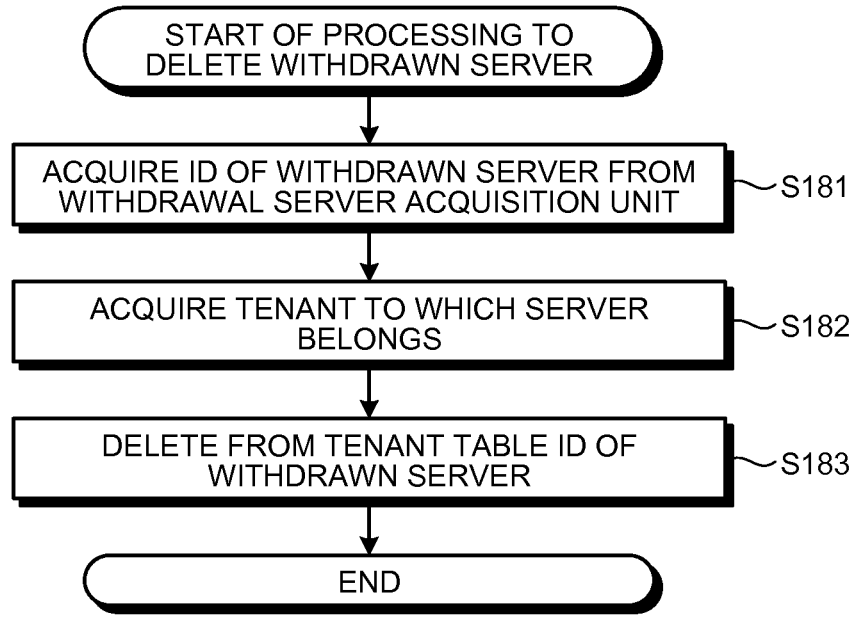
FIG. 24 is a flowchart illustrating processing to delete a withdrawn server according to the embodiment.
Figure 25:
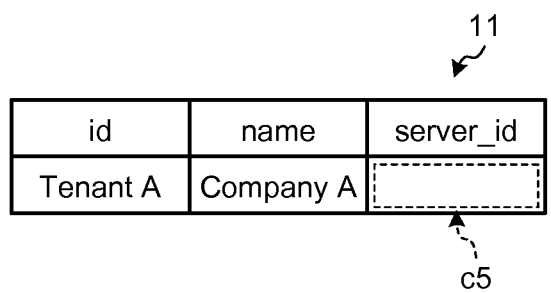
FIG. 25 is a schematic diagram illustrating a specific example of an updating of the tenant table.

The following describes the processing procedure at S48, at which the withdrawn server is deleted from the tenant table 11, illustrated in FIG. 9 with reference to FIG. 24. FIG. 24 is a flowchart illustrating processing to delete the withdrawn server according to the embodiment. In the explanation of the processing to delete withdrawn server, FIG. 25 is referred to. FIG. 25 is a schematic diagram illustrating a specific example of an updating of the tenant table.

First, the port shut-off unit 222 acquires the identification ID of the withdrawn server from the withdrawal server acquisition unit 215 of the tenant control unit 21 (Step S181). Then, the port shut-off unit 222 acquires the identification ID of the tenant to which the withdrawn server belongs (Step S182). For example, the port shut-off unit 222 acquires from the server table 13 the identification ID of the tenant corresponding to the acquired identification ID of the withdrawn server.

The port shut-off unit 222 deletes the identification ID of the withdrawn server corresponding to the acquired ID of the tenant on the basis of the tenant table 11 (Step S183). As exemplarily illustrated in FIG. 25, the tenant table 11 stores the identification ID of the server corresponding to "Tenant A" in the tenant identification ID as blank indicated with a numeral c5.

Flowchart of Processing to Delete Tenant According to the Embodiment

Figures 26, 27:
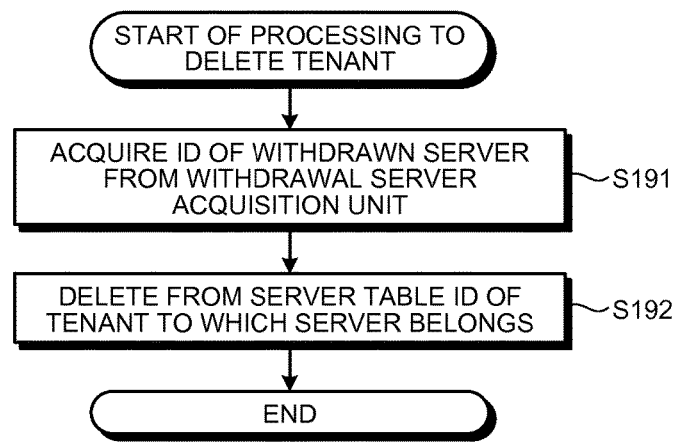
FIG. 26 is a flowchart illustrating processing to delete the tenant according to the embodiment.
FIG. 27 is a schematic diagram illustrating a specific example of an updating of the server table.

The following describes the processing procedure at S49, at which the tenant to which the withdrawn server belongs is deleted from the server table 13, illustrated in FIG. 9 with reference to FIG. 26. FIG. 26 is a flowchart illustrating processing to delete the tenant according to the embodiment. In the explanation of the processing to delete the tenant, FIG. 27 is referred to. FIG. 27 is a schematic diagram illustrating a specific example of an updating of the server table.

First, the port shut-off unit 222 acquires the identification ID of the withdrawn server from the withdrawal server acquisition unit 215 of the tenant control unit 21 (Step S191). The port shut-off unit 222 deletes the identification ID of the tenant corresponding to the acquired identification ID of the server on the basis of the server table 13 (Step S192). As exemplarily illustrated in FIG. 27, the server table 13 stores the identification ID of the tenant corresponding to "Server A" in the identification ID of the server as blank indicated with a numeral c6.

Specific Examples of Dialog Box

Figure 30:
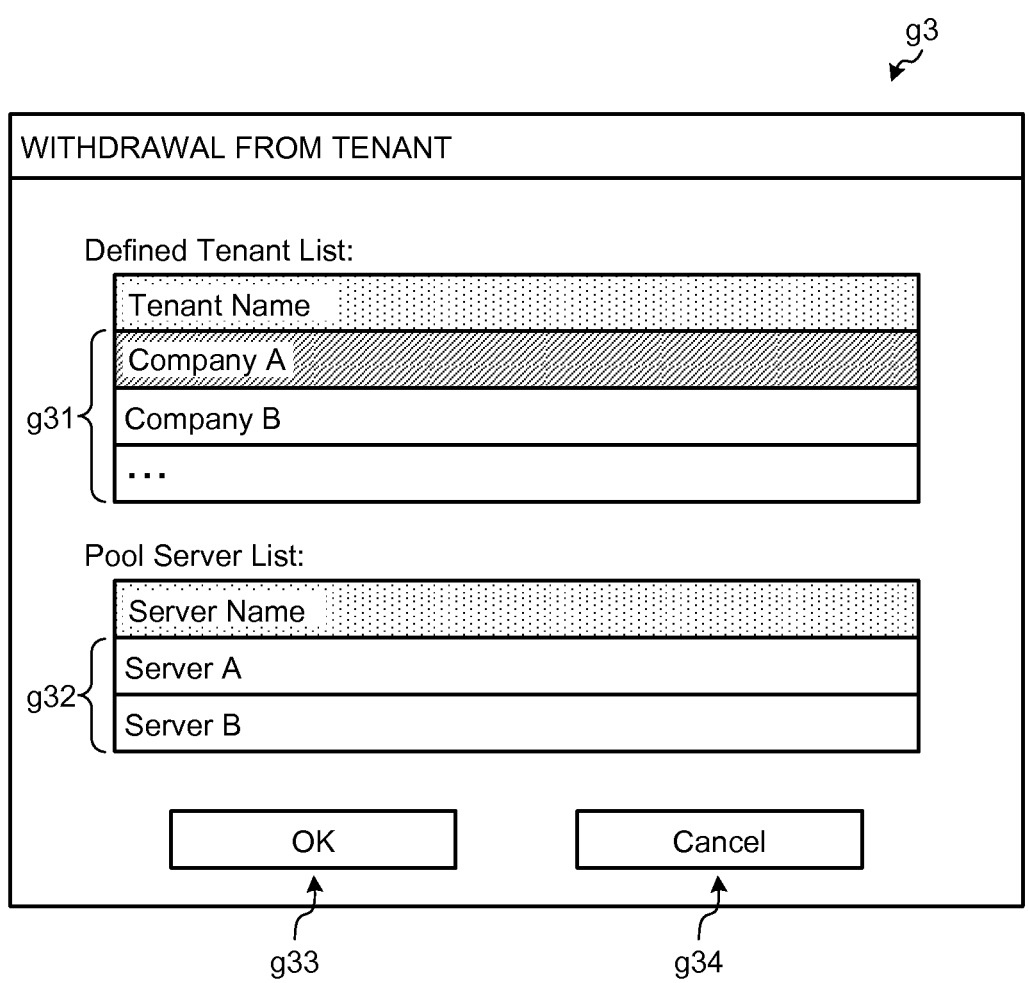
FIG. 30 is a schematic diagram illustrating an example of a dialog box displayed in processing to withdraw from the tenant.

The following describes specific examples of the dialog box displayed on the client terminal 2 with reference to FIGS. 28 to 30. FIG. 28 is a schematic diagram illustrating an example of the dialog box displayed in the processing to define the tenant. FIG. 29 is a schematic diagram illustrating an example of the dialog box displayed in the processing to participate in the tenant. FIG. 30 is a schematic diagram illustrating an example of the dialog box displayed in the processing to withdraw from the tenant.

As illustrated in FIG. 28, a dialog box g1 to define the tenant includes a text box g11, an acknowledgement button g12, and a cancel button g13. When the tenant is defined, a user inputs the name of the tenant in the text box g11. When the user presses down the acknowledgement button g12, the instruction to produce the tenant including the input tenant name is output to the network management apparatus 1 and the processing to define the tenant is performed. When the user presses down the cancel button g13, the processing to define the tenant is cancelled.

As illustrated in FIG. 29, a dialog box g2 to participate in the tenant includes a defined tenant list g21, a pool server list g22, an acknowledgement button g23, and a cancel button g24. The defined tenant list g21 displays the IDs of the tenants stored in the tenant table 11. The pool server list g22 displays the IDs of the servers stored in the server table 13.

When the server is caused to participate in the tenant, a user selects the tenant in which the server is caused to participate from the defined tenant list g21. The user also selects the server caused to participate in the tenant from the pool server list g22. When the user presses down the acknowledgement button g23, the IDs of the selected tenant and server are output to the network management apparatus 1, and the tenant participating processing is performed. When the user presses down the cancel button g24, the tenant participating processing is cancelled.

As illustrated in FIG. 30, a dialog box g3 to withdraw from the tenant includes a defined tenant list g31, a pool server list g32, an acknowledgement button g33, and a cancel button g34. The defined tenant list g31 displays the IDs of the tenants stored in the tenant table 11. The pool server list g32 displays the IDs of the servers that are stored in the server table 13 and belong to the tenant selected in the tenant list g31.

When the server is caused to withdraw from the tenant, the server selects the tenant from the defined tenant list g31. The user also selects the server caused to withdraw from the servers that belong to the selected tenant in the server list g32. When the user presses down the acknowledgement button g33, the instruction of the withdrawal from the tenant is output to the network management apparatus 1, and the tenant withdrawal processing is performed. When the user presses down the cancel button g34, the tenant withdrawal processing is cancelled.

For example, "Company A" and "Company B" are displayed in the defined tenant list g31 as the IDs of the defined tenants. When a user selects "Company A" as the tenant caused to withdraw, "Server A" and "Server B" are displayed in the pool server list g32 as the servers belonging to "Company A". The user then selects for example "Server A" from the server list g32 and presses down the acknowledgement button g33, upon which the tenant withdrawal processing of "Server A" will be performed.

Effects of the Embodiment

According to the embodiment, the network management apparatus 1 stores in the tenant table 11 the respective tenants included in the same subnet and the IDs of the servers belonging to the respective tenants in association with each other. The network management apparatus 1 stores in the server table 13 the port of the switch connected to the server as the connection destination port for each server. The network management apparatus 1 allows the switches to communicate between the connection destination ports so as to allow communication only between the servers belonging to the same tenant on the basis of the tenant table 11 and the server table 13. The network management apparatus 1 thus structured controls the connection destination ports of the switches such that communication is allowed between only the servers belonging to the same tenant, thereby making it possible to separate the communications of the respective tenants included in the same subnet from each other. As a result, the network management apparatus 1 can prevent information leakage and infection by a virus between the tenants, and thus secure security. The network management apparatus 1 can structure multiple tenants so as to be included in the same subnet and separate the communications of the respective tenants from each other, thereby making it possible to support tenants as many as or more than the limited number in the same subnet. In addition, the network management apparatus 1 can structure the LAN using the switches supplied from a single vendor or multiple vendors.

According to the embodiment, when the server is caused to participate, the network management apparatus 1 searches for the connection destination ports that control communication between the server caused to participate and the server belonging to the same tenant as the server caused to participate on the basis of the tenant table 11 and the server table 13. The network management apparatus 1 allows both servers to communicate with each other using the IP filtering on the respective searched connection destination ports such that the communication is allowed only between the server caused to participate and the servers belonging to the same tenant as the server caused to participate. The network management apparatus 1 thus structured shuts off the communication of the server caused to participate with the servers except for the servers belonging to the same tenant, thereby making it possible to prevent information leakage and infection by a virus between the same tenant and the other tenants. That is, the network management apparatus 1 can secure security.

According to the embodiment, when the switch is added to the network, the network management apparatus 1 controls all the ports of the switch to be inactive. The network management apparatus 1 thus structured once controls all the ports of the switch to be inactive when the switch is added, thereby making it possible to shut off the server connected to the switch from any communication. As a result, the network management apparatus 1 can activate the ports step by step when the server connected to the switch is caused to participate in the tenant after the inactive state.

According to the embodiment, when the server belonging to the tenant is caused to withdraw therefrom, the network management apparatus 1 searches for the connection destination port of the server on the basis of the server table 13. Then, the network management apparatus 1 controls the searched connection destination port so as to disallow communication of the servers except for the server caused to withdraw and the network management apparatus 1. The network management apparatus 1 thus structured can shut off the communication between the server caused to withdraw and the servers belonging to the tenant, thereby making it possible to secure security between the server caused to withdraw and the tenant.

In the embodiment, the switch addition determination unit 212 determines whether the switch instructed to be added is added on the basis of whether the model name can be acquired. The determination of the switch addition determination unit 212, however, is not limited to this manner. The switch addition determination unit 212 may determine whether the switch instructed to be added is added on the basis of whether unique information about the switch such as the vendor name can be acquired.

In the embodiment, the server addition determination unit 213 determines whether the server instructed to be added is added on the basis of whether the model name can be acquired. The determination of the server addition determination unit 213, however, is not limited to this manner. The server addition determination unit 213 may determine whether the server instructed to be added is added on the basis of whether unique information about the server such as the vendor name can be acquired.

Program and the Like

The network management apparatus 1 can be achieved by equipping the information processing apparatus such as a known personal computer or work station with the respective functions such as the storage unit 10 and the controller 20.

The components of the network management apparatus 1 illustrated in the drawings are not always required to be physically configured as illustrated in the drawings. That is, a specific form of distribution and integration of the network management apparatus 1 are not limited to those illustrated in the drawings. All or part of the network management apparatus 1 can be configured to be functionally or physically distributed or integrated in any units in accordance with various loads, the usage states, and the like. For example, the switch addition determination unit 212 and the server addition determination unit 213 may be integrated as one unit. The port control unit 221 may be separated into a port control unit used when the switch is added, another port control unit used when the server is added, and a still another port control unit used when the server is caused to participate in the tenant. The storage unit 10 including the tenant table 11 and the switch table 12 may be connected as an external device of the network management apparatus 1 through the network.

The various types of processing described in the embodiment can be achieved by a computer, such as a personal computer or a work station, executing a preliminarily prepared program. The following describes an example of a computer that executes the network management program having the same functions as the controller 20 of the network management apparatus 1 with reference to FIG. 31.

Figure 31:
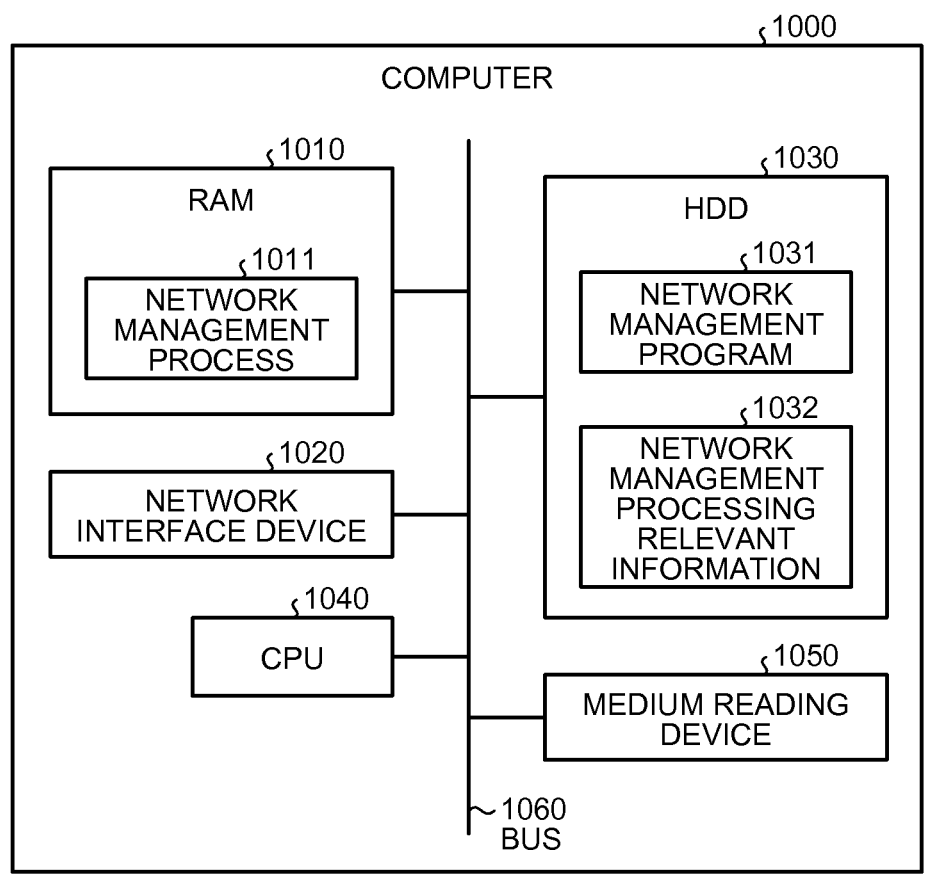
FIG. 31 is a schematic illustrating a computer executing a network management program.

FIG. 31 is a schematic diagram illustrating a computer executing the network management program. As illustrated in FIG. 31, a computer 1000 includes a RAM 1010, a network interface device 1020, an HDD 1030, a CPU 1040, a medium reading device 1050, and a bus 1060. The RAM 1010, the network interface device 1020, the HDD 1030, the CPU 1040, and the medium reading device 1050 are coupled with each other through the bus 1060.

The HDD 1030 stores therein a network management program 1031 having the same functions as the controller 20 illustrated in FIG. 1. The HDD 1030 stores therein network management processing relevant information 1032 corresponding to the tenant table 11, the switch table 12, the server table 13, and the port table 14 illustrated in FIG. 1.

The CPU 1040 reads out the network management program 1031 from the HDD 1030 and loads it to the RAM 1010. As a result, the network management program 1031 functions as a network management process 1011. The network management process 1011 accordingly loads information read from the network management processing relevant information 1032 to a region allocated to the network management process 1011 on the RAM 1010, and performs various types of data processing on the basis of the loaded data and the like.

The medium reading device 1050 reads out the network management program 1031 from a medium that stores therein the network management program 1031 even if the network management program 1031 is not stored in the HDD 1030. Examples of the medium reading device 1050 include a CD-ROM reader and an optical disk device.

The network interface device 1020 is coupled to an external device through the network, and may be coupled in a wired or wireless manner.

The network management program 1031 may be stored in another computer (or server) coupled to the computer 1000 through a public line, the Internet, the LAN, or a wide area network (WAN), for example. In this case, the computer 1000 reads out the network management program 1031 from the computer through the network interface device 1020 and executes it.

According to one aspect of an embodiment, a single subnet is separated into a plurality of networks.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A network management apparatus, comprising:
a first storage unit that stores therein communication groups included in the same subnet and information about communication devices belonging to the respective communication groups in association with each other, the information about communication devices including a model name of each communication device and an ID that identifies each communication device;
a second storage unit that stores therein a port of each communication device for each of the communication devices connected to a relaying device as a connection destination port; and
a controller that allows the relaying devices to perform communication between the connection destination ports on the basis of the first storage unit and the second storage unit to allow communication between the communication devices belonging to the same communication group, and to disallow communication between the communication devices not belonging to the same communication group, wherein when one or more of the communication devices is caused to participate in the communication group, the network management apparatus further comprises:
a port searching unit that searches for the connection destination ports controlling communication between the communication devices caused to participate and the communication device belonging to the same communication group as the communication devices caused to participate on the basis of the first storage unit and the second storage unit; and
a relaying device control unit that controls the connection destination ports searched by the port searching unit to be active to allow communication only between the communication devices caused to participate and the communication device belonging to the same communication group as the communication devices caused to participate when the model names of the communication devices caused to participate in the communication group can be acquired from the first storage unit.

2. The network management apparatus according to claim 1, wherein, when the relaying device is added to a network, the relaying device control unit controls all ports of the relaying device to be inactive.

3. The network management apparatus according to claim 1, further comprising:
a withdrawal port searching unit that searches for, when the communication device belonging to the communication group is caused to withdraw from the communication group, the connection destination port of the communication device on the basis of the second storage unit, wherein
the relaying device control unit further controls the connection destination port searched by the withdrawal port searching unit to disallow communication of the communication devices except for the communication device and the network management apparatus.

4. The network management apparatus according to claim 1, wherein the ID is allocated for each of the communication devices whose information is stored in the first storage unit, the ID identifying the group to which the communication device belongs.

5. A network management method by which a network management apparatus manages a network including communication groups included in a same subnet, the network management method comprising:
- when a relaying device is added to the network, controlling all ports of the relaying device to be inactive; and
- on the basis of a first storage unit that stores therein the communication groups and information about communication devices belonging to the respective communication groups in association with each other and a second storage unit that stores therein a port of a communication device for each of the communication devices connected to the relaying device as a connection destination port, allowing the relaying device to be added to perform communication between the communication destination ports to allow communication with the communication devices belonging to the same communication group, and to disallow communication between the communication devices not belonging to the same communication group, the information about communication devices including a model name of each communication device and an ID that identifies each communication device, wherein
- when one or more of the communication device is caused to participate in the communication group, the network management method further comprises:
- searching for the connection destination ports controlling communication between the communication devices caused to participate and the communication device belonging to the same communication group as the communication devices caused to participate; and
- controlling the connection destination ports searched at the searching to be active to allow communication only between the communication devices caused to participate and the communication device belonging to the same communication group as the communication devices caused to participate when the model names of the communication devices caused to participate in the communication group can be acquired from the first storage unit.

6. The network management method according to claim 5, wherein the ID is allocated for each of the communication devices whose information is stored in the first storage unit, the ID identifying the group to which the communication device belongs.

7. A non-transitory computer-readable recording medium having stored therein a program causing a computer to execute a process comprising:
- when a relaying device is added to a network including communication groups included in a same subnet, controlling all ports of the relaying device to be inactive; and
- on the basis of a first storage unit that stores therein the communication groups and information about communication devices belonging to the respective communication groups in association with each other and a second storage unit that stores therein a port of a communication device for each of the communication devices connected to the relaying device as a connection destination port, allowing the relaying device to be added to perform communication between the communication destination ports to allow communication with the communication devices belonging to the same communication group, and to disallow communication between the communication devices not belonging to the same communication group, the information about communication devices including a model name of each communication device and an ID that identifies each communication device, wherein
- when one or more of the communication device is caused to participate in the communication group, the process further comprises:
- searching for the connection destination ports controlling communication between the communication devices caused to participate and the communication device belonging to the same communication group as the communication devices caused to participate; and
- controlling the connection destination ports searched at the searching to be active to allow communication only between the communication devices caused to participate and the communication device belonging to the same communication group as the communication devices caused to participate when the model names of the communication devices caused to participate in the communication group can be acquired from the first storage unit.

8. The non-transitory computer-readable recording medium according to claim 7, wherein the ID is allocated for each of the communication devices whose information is stored in the first storage unit, the ID identifying the group to which the communication device belongs.

* * * * *